US012600366B2

(12) United States Patent
Bang

(10) Patent No.: US 12,600,366 B2
(45) Date of Patent: Apr. 14, 2026

(54) APPARATUS FOR CONTROLLING AUTONOMOUS DRIVING AND METHOD THEREOF

(71) Applicants: Hyundai Motor Company, Seoul (KR); Kia Corporation, Seoul (KR)

(72) Inventor: Kyung Joo Bang, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 152 days.

(21) Appl. No.: 18/353,319

(22) Filed: Jul. 17, 2023

(65) Prior Publication Data

US 2024/0199039 A1 Jun. 20, 2024

(30) Foreign Application Priority Data

Dec. 14, 2022 (KR) ........................ 10-2022-0175192

(51) Int. Cl.
*B60W 50/02* (2012.01)
*B60W 40/105* (2012.01)
(Continued)

(52) U.S. Cl.
CPC ...... *B60W 50/0205* (2013.01); *B60W 40/105* (2013.01); *B60W 40/114* (2013.01); *B60W 50/14* (2013.01); *B60W 60/0015* (2020.02); *H04W 4/46* (2018.02); *B60W 2050/021* (2013.01); *B60W 2050/0215* (2013.01); (Continued)

(58) Field of Classification Search
CPC ......... B60W 50/0205; B60W 60/0015; B60W 40/105; B60W 40/114; B60W 50/14; B60W 2540/215; B60W 2556/20; B60W 2556/65; B60W 2556/35; B60W 2050/021; B60W 2050/146; B60W 2520/14; B60W 2050/0215; H04W 4/46

See application file for complete search history.

(56) References Cited

U.S. PATENT DOCUMENTS

2015/0166071 A1* 6/2015 Komar ................... B60W 40/04
701/32.4
2015/0302744 A1* 10/2015 Lin ....................... G08G 1/0175
705/311

(Continued)

*Primary Examiner* — Jay Khandpur
(74) *Attorney, Agent, or Firm* — Slater Matsil, LLP

(57) ABSTRACT

An embodiment autonomous driving control apparatus includes a controller operatively connected to a communication device, a sensor device, and a memory storing instructions, wherein the controller is configured to execute the instructions stored in the memory to cause the autonomous driving control apparatus to transmit, using the communication device, a cross-check request for a detection vehicle or a host vehicle to another vehicle in response to detection of the detection vehicle satisfying a specified condition determined by the sensor device, identify an operating state of the sensor device based on a host vehicle existence response or a host vehicle absence response among responses received from the other vehicle in response to the cross-check request, and determine whether the detection vehicle is present based on a detection vehicle existence response or a detection vehicle absence response among the responses received from the other vehicle in response to the cross-check request.

20 Claims, 11 Drawing Sheets

(51) Int. Cl.

| | |
|---|---|
| *B60W 40/114* | (2012.01) |
| *B60W 50/14* | (2020.01) |
| *B60W 60/00* | (2020.01) |
| *H04W 4/46* | (2018.01) |

(52) U.S. Cl.

CPC ... *B60W 2050/146* (2013.01); *B60W 2520/14* (2013.01); *B60W 2540/215* (2020.02); *B60W 2556/20* (2020.02); *B60W 2556/35* (2020.02); *B60W 2556/65* (2020.02)

(56) References Cited

U.S. PATENT DOCUMENTS

| | | | |
|---|---|---|---|
| 2019/0068582 A1* | 2/2019 | Kim | G01S 5/0072 |
| 2019/0155001 A1* | 5/2019 | Lin | G02B 1/11 |
| 2020/0210176 A1 | 7/2020 | Wu et al. | |
| 2021/0319692 A1* | 10/2021 | Ucar | G08G 1/0141 |
| 2021/0323164 A1* | 10/2021 | Zhang | B25J 9/1692 |
| 2022/0080992 A1 | 3/2022 | Yousuf et al. | |
| 2022/0221016 A1* | 7/2022 | Sienkiewicz | H04W 4/80 |
| 2023/0073287 A1* | 3/2023 | Iba | B60W 30/188 |
| 2023/0356714 A1* | 11/2023 | Baba | G08G 1/16 |

* cited by examiner

APPARATUS FOR CONTROLLING AUTONOMOUS DRIVING AND METHOD THEREOF

CROSS-REFERENCE TO RELATED APPLICATIONS

This application claims the benefit of Korean Patent Application No. 10-2022-0175192, filed on Dec. 14, 2022, which application is hereby incorporated herein by reference.

TECHNICAL FIELD

The present disclosure relates to an autonomous driving control apparatus and a method thereof.

BACKGROUND

As autonomous driving vehicles are gradually increased, various technologies related to autonomous driving are being developed. For example, for the stable driving of autonomous driving vehicles, it is needed to develop a technology for measuring a driving environment, a technology for controlling the driving of a vehicle depending on the measured driving environment, and a technology for accurately detecting objects (e.g., other vehicles) present outside an autonomous driving vehicle.

Such autonomous driving vehicle may detect whether at least one component for driving control operates normally by using a plurality of control apparatuses. For example, each of the plurality of control apparatuses may monitor in real time whether different components (e.g., at least one of a camera, radar, LiDAR, or any combination thereof included in a sensor device) are normally operating.

In particular, the autonomous driving vehicle may detect whether the components are normally operating by using sensor data obtained by a sensor.

However, it may be difficult to detect whether a sensor fails based on external factors or specific errors. For example, when an operation error occurs because at least one sensor receives an external shock, a sensor offset is changed, incorrect parameters are entered, or errors and/or delays in communication occur, it may be difficult for the autonomous driving vehicle to detect whether the sensor is operating normally in real time.

SUMMARY

The present disclosure relates to an autonomous driving control apparatus and a method thereof. Particular embodiments relate to a technology of performing cross-check through the detection result of at least one other vehicle to determine whether a sensor device is operating normally, or a technology of again determining whether a detection vehicle is present, through a user's response when a host vehicle detects the detection vehicle that satisfies a specified condition.

Embodiments of the present disclosure can solve problems occurring in the prior art while advantages achieved by the prior art are maintained intact.

An embodiment of the present disclosure provides an autonomous driving control apparatus that performs a sensor state identification function by transmitting a surrounding situation (e.g., whether an external object is present and/or a current location of a host vehicle) detected by an autonomous driving vehicle to at least one other vehicle and receiving and comparing the detection result from the at least one other vehicle and a method thereof.

An embodiment of the present disclosure provides an autonomous driving control apparatus that performs the sensor state identification function by further using a cognitive situation in a specific situation (e.g., a situation in which mutual verification is impossible by using the decision result received from at least one other vehicle) of a user (or driver) as information about a surrounding situation and a method thereof.

An embodiment of the present disclosure provides an autonomous driving control apparatus that enables the sensor state identification function to be consistently performed through repeated mutual verification with surrounding vehicles and a method thereof.

The technical problems solvable by embodiments of the present disclosure are not limited to the aforementioned problems and any other technical problems not mentioned herein will be clearly understood from the following description by those skilled in the art to which the present disclosure pertains.

According to an embodiment of the present disclosure, an autonomous driving control apparatus may include a communication device, a sensor device, a memory for storing instructions, and a controller operatively connected to the communication device, the sensor device, and the memory. For example, when executed by the controller, the instructions may cause the autonomous driving control apparatus to transmit a cross-check request for at least one of a detection vehicle, a host vehicle, or a combination of the detection vehicle and the host vehicle to at least one other vehicle by using the communication device when detecting the detection vehicle satisfying a specified condition by using the sensor device, to identify an operating state of the sensor device based on a host vehicle existence response and a host vehicle absence response among a response received from the at least one other vehicle in response to the cross-check request, and to determine whether the detection vehicle is present based on a detection vehicle existence response and a detection vehicle absence response among the response received from the at least one other vehicle in response to the cross-check request.

According to an embodiment, when executed by the controller, the instructions may cause the autonomous driving control apparatus to transmit, to the at least one other vehicle, the cross-check request including at least one of location information of the host vehicle, location information of the detection vehicle, speed information of the host vehicle, speed information of the detection vehicle, or a combination of the location information of the host vehicle, the location information of the detection vehicle, the speed information of the host vehicle, and the speed information of the detection vehicle.

According to an embodiment, the response received from the at least one other vehicle may include information about whether at least one of the host vehicle, the detection vehicle, or a combination of the host vehicle and the detection vehicle is present in an existence possibility expectation area calculated based on at least one of location information of the host vehicle, location information of the detection vehicle, speed information of the host vehicle, speed information of the detection vehicle, a maximum acceleration of the host vehicle, a maximum acceleration of the detection vehicle, a maximum yaw rate of the host vehicle, a maximum yaw rate of the detection vehicle, a communication delay between the host vehicle and the at least one other vehicle, a communication delay between the detection vehicle and the at least one other vehicle, or a combination of the location information of the host vehicle, the location information of the detection vehicle, the speed information of the host vehicle, the speed information of the detection vehicle, the maximum acceleration of the host vehicle, the maximum acceleration of the detection vehicle, the maximum yaw rate of the host vehicle, the maximum yaw rate of the detection vehicle, the communication delay between the host vehicle and the at least one other vehicle, and the communication delay between the detection vehicle and the at least one other vehicle.

According to an embodiment, the specified condition may include at least one of whether a vehicle is new, whether sensor fusion data reliability of the sensor device is not greater than a specified value, whether a vehicle is stopped on a highway, whether a vehicle is driving in reverse, whether a vehicle violates a traffic rule, whether a vehicle is driving on a shoulder lane, or a combination of whether the vehicle is new, whether the sensor fusion data reliability of the sensor device is not greater than the specified value, whether the vehicle is stopped on the highway, whether the vehicle is driving in reverse, whether the vehicle violates the traffic rule, and whether the vehicle is driving on the shoulder lane.

According to an embodiment, when executed by the controller, the instructions may cause the autonomous driving control apparatus to determine that the operating state of the sensor device is abnormal when it is identified that the number of the host vehicle existence response is not greater than a value obtained by subtracting '1' from the number of the host vehicle absence response.

According to an embodiment, when executed by the controller, the instructions may cause the autonomous driving control apparatus to determine that the detection vehicle is present and to determine that the operating state of the sensor device is normal when it is identified that the number of the detection vehicle existence response is greater than a value obtained by subtracting '1' from the number of the detection vehicle absence response.

According to an embodiment, when executed by the controller, the instructions may cause the autonomous driving control apparatus to determine that the detection vehicle is not present and to determine that the operating state of the sensor device is abnormal when it is identified that the number of the detection vehicle existence response is less than a value obtained by subtracting '1' from the number of the detection vehicle absence response.

According to an embodiment, the autonomous driving control apparatus may further include a display device. For example, when executed by the controller, the instructions may cause the autonomous driving control apparatus to display a user interface for requesting for determining whether the detection vehicle is present, through the display device, when the number of the detection vehicle existence response is the same as the number of the detection vehicle absence response, to determine that the detection vehicle is present and to determine that the operating state of the sensor device is normal when receiving an input indicating that the detection vehicle is present from a user through the user interface, and to determine that the detection vehicle is not present and to determine that the operating state of the sensor device is abnormal when receiving an input indicating that the detection vehicle is not present through the user interface.

According to an embodiment, at least one of the host vehicle existence response, the host vehicle absence response, the detection vehicle existence response, the detection vehicle absence response, or a combination of the host vehicle existence response, the host vehicle absence response, the detection vehicle existence response, and the detection vehicle absence response may be calculated by using a different weight determined based on at least one of a type of a sensor, the number of sensors, reliability of the sensor, a detected area, or a combination of the type of the sensor, the number of the sensors, the reliability of the sensor, and the detected area, which is used by the at least one other vehicle to detect whether at least one of the host vehicle, the detection vehicle, or a combination of the host vehicle and the detection vehicle is present.

According to an embodiment of the present disclosure, an autonomous driving control system may include a request vehicle that transmits a cross-check request for a detection vehicle, a request vehicle, or a combination of the detection vehicle and the request vehicle to an outside and identifies an operating state of a sensor device or determines whether the detection vehicle is present based on at least one of a detection vehicle existence response, a detection vehicle absence response, a request vehicle existence response, a request vehicle absence response, or a combination of the detection vehicle existence response, the detection vehicle absence response, the request vehicle existence response, and the request vehicle absence response, which is received in response to the cross-check request, when a detection vehicle satisfying a specified condition is detected, and a response vehicle that receives the cross-check request from the request vehicle, calculates at least one existence possibility expectation area of the request vehicle, the detection vehicle, or a combination of the request vehicle and the detection vehicle, determines whether at least one of the request vehicle, the detection vehicle, or the combination of the request vehicle and the detection vehicle is present in the existence possibility expectation area, and transmits the determination result to a surrounding vehicle including the request vehicle.

According to an embodiment, the request vehicle may transmit, to the response vehicle, the cross-check request including at least one of location information of the request vehicle, location information of the detection vehicle, speed information of the request vehicle, speed information of the detection vehicle, or a combination of the location information of the request vehicle, the location information of the detection vehicle, the speed information of the request vehicle, and the speed information of the detection vehicle.

According to an embodiment, the response vehicle may calculate the existence possibility expectation area based on at least one of the location information of the request vehicle, the location information of the detection vehicle, the speed information of the request vehicle, the speed information of the detection vehicle, a maximum acceleration of the request vehicle, a maximum acceleration of the detection vehicle, a maximum yaw rate of the request vehicle, a maximum yaw rate of the detection vehicle, a communication delay between the request vehicle and the response vehicle, a communication delay between the detection vehicle and the response vehicle, or a combination of the location information of the request vehicle, the location information of the detection vehicle, the speed information of the request vehicle, the speed information of the detection vehicle, the maximum acceleration of the request vehicle, the maximum acceleration of the detection vehicle, the maximum yaw rate of the request vehicle, the maximum yaw rate of the detection vehicle, the communication delay between the request vehicle and the response vehicle, and the communication delay between the detection vehicle and the response vehicle.

According to an embodiment, the specified condition may include at least one of whether a vehicle is new, whether sensor fusion data reliability of the sensor device is not greater than a specified value, whether a vehicle is stopped on a highway, whether a vehicle is driving in reverse, whether a vehicle violates a traffic rule, whether a vehicle is driving on a shoulder lane, or a combination of whether the vehicle is new, whether the sensor fusion data reliability of the sensor device is not greater than the specified value, whether the vehicle is stopped on the highway, whether the vehicle is driving in reverse, whether the vehicle violates the traffic rule, and whether the vehicle is driving on the shoulder lane.

According to an embodiment, the request vehicle may identify a positioning state of the request vehicle by comparing the number of the detection vehicle existence response and the number of the detection vehicle absence response, which are received from a plurality of other vehicles including the response vehicle, and may determine whether the detection vehicle is present by comparing the number of the request vehicle existence response and the number of the request vehicle absence response which are received from the plurality of other vehicles including the response vehicle.

According to an embodiment, the request vehicle may display a user interface for requesting for determining whether the detection vehicle is present and may determine whether the detection vehicle is present based on receiving a user input regarding whether the detection vehicle is present, from a user through the user interface, when it is not determined whether the detection vehicle is present.

According to an embodiment, the response vehicle may transmit, to the surrounding vehicle including the request vehicle, the determination result including at least one of a type of a sensor, the number of sensors, reliability of the sensor, a detected area, or a combination of the type of the sensor, the number of the sensors, the reliability of the sensor, and the detected area, which is used to detect whether at least one of the request vehicle, the detection vehicle, or a combination of the request vehicle and the detection vehicle is present in the existence possibility expectation area.

According to an embodiment, the request vehicle may calculate at least one of the number of the detection vehicle existence response, the number of the detection vehicle absence response, the number of the request vehicle existence response, the number of the request vehicle absence response, or a combination of the number of the detection vehicle existence response, the number of the detection vehicle absence response, the number of the request vehicle existence response, and the number of the request vehicle absence response by using a weight determined based on the determination result.

According to an embodiment of the present disclosure, an autonomous driving control method may include transmitting, by a controller, a cross-check request for at least one of a detection vehicle, a host vehicle, or a combination of the detection vehicle and the host vehicle to at least one other vehicle by using a communication device when detecting the detection vehicle satisfying a specified condition by using a sensor device, identifying, by the controller, an operating state of the sensor device based on a host vehicle existence response and a host vehicle absence response among a response received from the at least one other vehicle in response to the cross-check request, and determining, by the controller, whether the detection vehicle is present, based on a detection vehicle existence response and a detection vehicle absence response among the response received from the at least one other vehicle in response to the cross-check request.

According to an embodiment, the transmitting, by the controller, of the cross-check request for at least one of the detection vehicle, the host vehicle, or the combination of the detection vehicle and the host vehicle to the at least one other vehicle by using the communication device may include transmitting, to the at least one other vehicle, the cross-check request including at least one of location information of the host vehicle, location information of the detection vehicle, speed information of the host vehicle, speed information of the detection vehicle, or a combination of the location information of the host vehicle, the location information of the detection vehicle, the speed information of the host vehicle, and the speed information of the detection vehicle.

According to an embodiment, the response received from the at least one other vehicle may include information about whether at least one of the host vehicle, the detection vehicle, or a combination of the host vehicle and the detection vehicle is present in an existence possibility expectation area calculated based on at least one of location information of the host vehicle, location information of the detection vehicle, speed information of the host vehicle, speed information of the detection vehicle, a maximum acceleration of the host vehicle, a maximum acceleration of the detection vehicle, a maximum yaw rate of the host vehicle, a maximum yaw rate of the detection vehicle, a communication delay between the host vehicle and the at least one other vehicle, a communication delay between the detection vehicle and the at least one other vehicle, or a combination of the location information of the host vehicle, the location information of the detection vehicle, the speed information of the host vehicle, the speed information of the detection vehicle, the maximum acceleration of the host vehicle, the maximum acceleration of the detection vehicle, the maximum yaw rate of the host vehicle, the maximum yaw rate of the detection vehicle, the communication delay between the host vehicle and the at least one other vehicle, and the communication delay between the detection vehicle and the at least one other vehicle.

According to an embodiment, the identifying, by the controller, of the operating state of the sensor device based on the host vehicle existence response and the host vehicle absence response among the response received from the at least one other vehicle in response to the cross-check request may include determining, by the controller, that the operating state of the sensor device is abnormal when it is identified that the number of the host vehicle existence response is not greater than a value obtained by subtracting '1' from the number of the host vehicle absence response.

According to an embodiment, the determining, by the controller, of whether the detection vehicle is present, based on the detection vehicle existence response and the detection vehicle absence response among the response received from the at least one other vehicle in response to the cross-check request may include determining that the detection vehicle is present and determining that the operating state of the sensor device is normal when it is identified that the number of the detection vehicle existence response is greater than a value obtained by subtracting '1' from the number of the detection vehicle absence response.

BRIEF DESCRIPTION OF THE DRAWINGS

The above and other objects, features, and advantages of embodiments of the present disclosure will be more apparent from the following detailed description taken in conjunction with the accompanying drawings, in which.

Figure 1:
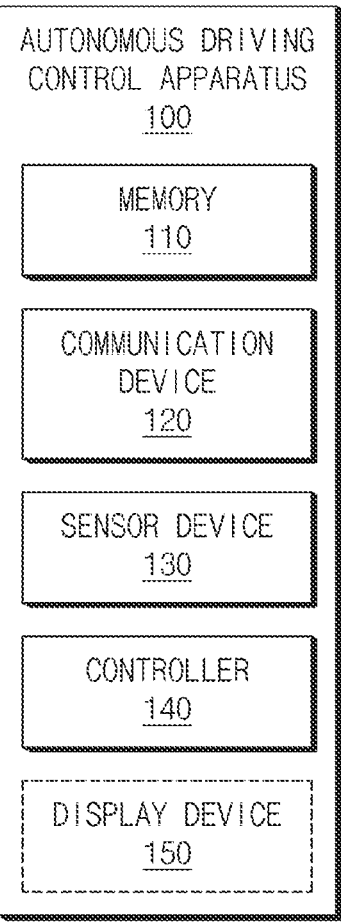
FIG. 1 is a block diagram showing components of an autonomous driving control apparatus according to an embodiment of the present disclosure.

With regard to the description of drawings, the same or similar components will be marked by the same or similar reference signs.

DETAILED DESCRIPTION OF ILLUSTRATIVE EMBODIMENTS

Hereinafter, some embodiments of the present disclosure will be described in detail with reference to the accompanying drawings. In adding reference numerals to components of each drawing, it should be noted that the same components have the same reference numerals, although they are indicated on another drawing. Furthermore, in describing the embodiments of the present disclosure, detailed descriptions associated with well-known functions or configurations will be omitted when they may make subject matters of embodiments of the present disclosure unnecessarily obscure.

In describing elements of an embodiment of the present disclosure, the terms first, second, A, B, (a), (b), and the like may be used herein. These terms are only used to distinguish one element from another element but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It will be understood that terms used herein should be interpreted as having a meaning that is consistent with their meaning in the context of embodiments of the present disclosure and the relevant art and will not be interpreted in an idealized or overly formal sense unless expressly so defined herein.

Hereinafter, various embodiments of the present disclosure will be described in detail with reference to FIGS. 1 to 11.

FIG. 1 is a block diagram showing components of an autonomous driving control apparatus according to an embodiment of the present disclosure.

According to an embodiment, an autonomous driving control apparatus 100 may include at least one of a memory 110, a communication device 120, a sensor device 130, a controller 140, a display device 150, or any combination thereof. The configuration of the autonomous driving control apparatus 100 shown in FIG. 1 is an example, and embodiments of the present disclosure are not limited thereto. For example, the autonomous driving control apparatus 100 may further include components not shown in FIG. 1 (e.g., an interface device).

According to an embodiment, the memory 110 may store instructions or data. For example, the memory 110 may store one or more instructions that cause the autonomous driving control apparatus 100 to perform various operations when executed by the controller 140.

For example, the memory 110 and the controller 140 may be implemented as one chipset. The controller 140 may include at least one of a communication processor or a modem.

For example, the memory 110 may store various pieces of information related to the autonomous driving control apparatus 100. For example, the memory 110 may store information about the operation history of the controller 140. For example, the memory 110 may store information related to states and/or operations of components (e.g., at least one of an engine control unit (ECU), a communication device 120, a sensor device 130, a controller 140, a display device 150, or any combination thereof) of the host vehicle. For example, the memory 110 may store a minimum value among a plurality of steering avoidance final times calculated for the at least one driving route in correspondence with at least one driving route.

According to an embodiment, the communication device 120 may establish a communication channel (e.g., a wireless communication channel) between the autonomous driving control apparatus 100 and an external device (e.g., an autonomous driving control apparatus 202 of FIG. 2) and may support communication through the established communication channel. For example, the communication device 120 may include one or more communication processors which are operated independently of the controller 140 (e.g., an application processor) and support direct (or wired) communication or wireless communication.

For example, the communication device 120 may include a wireless communication module (e.g., a cellular communication module, a short range wireless communication module, or a global navigation satellite system (GNSS) communication module) or a wired communication module (e.g., a local area network (LAN) communication module or a power line communication module). The corresponding communication module among these communication modules may communicate with an external device through a first network (e.g., a short-range communication network such as Bluetooth, wireless fidelity (WiFi) direct or infrared data association (IrDA)) or a second network (e.g., a legacy cellular network, 5G networks, next-generation communication networks, Internet, or telecommunication networks such as computer networks (e.g., LAN or WAN)) included in a network. The above-described kinds of communication modules may be integrated in one component (e.g., a single chip) or may be implemented with a plurality of components (e.g., a plurality of chips) which are independent of each other. Also, the communication device 120 and the controller 140 may be implemented as a single chip.

For example, the communication device 120 may transmit or receive various data based on communication with an external device.

For example, the communication device 120 may transmit a cross-check request to at least one other vehicle (or an autonomous driving control apparatus corresponding to the other vehicle). For example, the cross-check request may include a control signal for requesting the transmission of information about whether a detection vehicle is present.

For example, the communication device 120 may receive at least one response generated in response to the cross-check request from at least one other vehicle. For example, the response may include at least one of a host vehicle existence response, a host vehicle absence response, a host vehicle existence determination impossibility, or any combination thereof. For example, the response may include at least one of a detection vehicle existence response, a detection vehicle absence response, a detection vehicle existence determination impossibility, or any combination thereof.

According to an embodiment, the sensor device 130 may obtain (or sense) various pieces of information used for vehicle driving.

For example, the sensor device 130 may include at least one sensor including at least one of a camera, radar, LiDAR, or any combination thereof.

For example, the sensor device 130 may obtain information about an external object (e.g., at least one of a person, another vehicle, a building, a structure, or any combination thereof) by using at least one sensor.

For example, the sensor device 130 may obtain information about whether at least one other vehicle is present and/or a driving state (e.g., at least one of a driving speed, a driving direction, a distance from a host vehicle, whether a vehicle is stopped, or any combination thereof).

For example, the sensor device 130 may obtain data (e.g., sensor fusion data) through a sensor set including at least one sensor. For example, the sensor device 130 may include a plurality of sensor sets for obtaining data for each of a plurality of areas that are logically and/or physically separated from each other.

According to an embodiment, the controller 140 may be operatively connected to the memory 110, the communication device 120, the sensor device 130, and/or the display device 150. For example, the controller 140 may control operations of the memory 110, the communication device 120, the sensor device 130, and/or the display device 150.

For example, the controller 140 may detect the detection vehicle by using the sensor device 130. For example, the detection vehicle may include a vehicle that satisfies a specified condition.

For example, the specified condition may include at least one of whether the detected vehicle is a new vehicle, whether the reliability of the sensor fusion data of the sensor device 130 detecting the detection vehicle is not greater than a specified value, whether a vehicle is stopped on a highway, whether a vehicle is driving in reverse, whether a vehicle has violated traffic rules, whether a vehicle is driving on a shoulder lane, or any combination thereof. For example, the controller 140 may identify that a vehicle, which satisfies at least one of the above-described conditions, from among detected vehicles is a detection vehicle. In other words, the controller 140 may detect a vehicle driving in an abnormal driving state as a detection vehicle.

For example, when detecting a detection vehicle, the controller 140 may transmit a cross-check request for at least one of a detection vehicle, a host vehicle, or any combination thereof to at least one other vehicle by using the communication device 120. For example, the at least one other vehicle may include an adjacent vehicle of the host vehicle, which is distinguished from the detection vehicle. For example, the controller 140 may transmit, to the at least one other vehicle, a cross-check request including a request for determining whether a detection vehicle and/or a host vehicle is present, by using the communication device 120.

For example, the controller 140 may transmit, to the at least one other vehicle, a cross-check request including at least one of location information of the host vehicle, location information of the detection vehicle, speed information of the host vehicle, speed information of the detection vehicle, or any combination thereof.

For example, the controller 140 may further transmit, to the at least one other vehicle, at least one of the maximum acceleration of the host vehicle, the maximum acceleration of the detection vehicle, the maximum yaw rate of the host vehicle, the maximum yaw rate of the detection vehicle, or any combination thereof.

For example, the controller 140 may receive a response transmitted in response to the cross-check request from the at least one other vehicle. For example, the controller 140 may receive a plurality of responses respectively transmitted from a plurality of other vehicles.

For example, the response received in response to the cross-check request may include at least one of a host vehicle existence response, a host vehicle absence response, a host vehicle existence determination impossibility, or any combination thereof. For example, the response may include at least one of a detection vehicle existence response, a detection vehicle absence response, a detection vehicle existence determination impossibility, or any combination thereof. In other words, in response to the cross-check request transmitted from the autonomous driving control apparatus 100 of the host vehicle, the at least one other vehicle may determine whether a host vehicle and/or a detection vehicle is present, and then may transmit a response including the determination result to the autonomous driving control apparatus 100 of the host vehicle.

For example, on the basis of at least some of the received responses, the controller 140 may identify an operating state of the sensor device 130 and/or determine whether a detection vehicle is present.

For example, the controller 140 may identify an operating state (or a positioning state of a host vehicle) of a sensor device by comparing the number of host vehicle existence responses with the number of host vehicle absence responses among responses received from the at least one other vehicle.

For example, when it is identified that the number of host vehicle existence responses received from the at least one other vehicle is not greater than a value obtained by subtracting '1' from the number of host vehicle absence responses, the controller 140 may determine that an operating state of the sensor device 130 is abnormal. In other words, when the number of other vehicles, which have responded that the host vehicle is present, from among at least one other vehicle is not greater than a value obtained by subtracting 1 from the number of other vehicles responding that the host vehicle is not present, the controller 140 may determine that the operating state of the sensor device 130 is abnormal.

For example, when it is identified that the number of host vehicle existence responses received from at least one other vehicle is greater than a value obtained by subtracting '1' from the number of host vehicle absence responses, the controller 140 may determine that the operating state of the sensor device 130 is normal. In other words, when the number of other vehicles, which have responded that the host vehicle is present, from among at least one other vehicle is greater than a value obtained by subtracting 1 from the number of other vehicles responding that the host vehicle is not present, the controller 140 may determine that the operating state of the sensor device 130 is normal.

For example, the controller 140 may identify an operating state of a sensor device and/or determine whether a detection vehicle is present, by comparing the number of detection vehicle existence responses with the number of detection vehicle absence responses among responses received from at least one other vehicle.

For example, when it is identified that the number of detection vehicle existence responses received from at least one other vehicle is greater than a value obtained by subtracting '1' from the number of detection vehicle absence responses, the controller 140 may determine that a detection vehicle is present and may determine that the operating state of the sensor device 130 is normal. In other words, when the number of other vehicles, which have responded that the detection vehicle is present, from among at least one other vehicle is greater than a value obtained by subtracting 1 from the number of other vehicles responding that the detection vehicle is not present, the controller 140 may determine that the operating state of the sensor device 130 is normal and may determine that a detection vehicle is present.

For example, when it is identified that the number of detection vehicle existence responses received from at least one other vehicle is less than a value obtained by subtracting '1' from the number of detection vehicle absence responses, the controller 140 may determine that a detection vehicle is not present and may determine that the operating state of the sensor device 130 is abnormal. In other words, when the number of other vehicles, which have responded that the detection vehicle is present, from among at least one other vehicle is less than a value obtained by subtracting 1 from the number of other vehicles responding that the detection vehicle is not present, the controller 140 may determine that the detection vehicle is not present and may determine that the operating state of the sensor device 130 is abnormal.

For example, when it is identified that the number of detection vehicle existence responses received from at least one other vehicle is the same as a value obtained by subtracting '1' from the number of detection vehicle absence responses, the controller 140 may determine that it is not determined whether a detection vehicle is present and may determine whether a detection vehicle is present through a user input. For example, the controller 140 may display, through the display device 150, a user interface for requesting determination of whether a detection vehicle is present. The user interface may include at least one graphic user interface (GUI) for a request for determining whether a detection vehicle is present. For example, when the controller 140 receives an input indicating that a detection vehicle is present from a user through the user interface, the controller 140 may determine that a detection vehicle is present and may determine that the operating state of the sensor device 130 is normal. For example, when the controller 140 receives an input indicating that a detection vehicle is not present from a user through the user interface, the controller 140 may determine that the detection vehicle is not present and may determine that the operating state of the sensor device 130 is abnormal.

For example, the host vehicle absence response may include a response when it is impossible to detect the host vehicle.

For example, when a separation range (or a separation distance) between a part of at least one other vehicle and the host vehicle is out of a detectable range (or a detectable distance) of a part of at least one other vehicle, a part of at least one other vehicle may transmit a host vehicle absence response to the autonomous driving control apparatus 100 in response to the cross-check request.

For example, when an external object (e.g., a vehicle) is present between at least part of another vehicle and the host vehicle, a part of at least one other vehicle may not detect the host vehicle due to the external object. In this case, the part of at least one other vehicle may transmit a host vehicle absence response to the autonomous driving control apparatus 100 in response to the cross-check request.

An operation of the controller 140 is an example, and embodiments of the present disclosure are not limited thereto. For example, the controller 140 may use at least one of a host vehicle existence response, a host vehicle absence response, a detection vehicle existence response, a detection vehicle absence response, or any combination thereof, which is calculated by using different weights determined based on at least one of a sensor type, the number of sensors, the reliability of a sensor, a detected area, or any combination thereof. The sensor type, the number of sensors, the reliability of a sensor, the detected area, or any combination thereof is used such that at least one other vehicle detects whether at least one of a host vehicle, a detection vehicle, or any combination thereof is present.

For example, when a first other vehicle among at least one other vehicle transmits a response indicating that the host vehicle is present, the autonomous driving control apparatus 100 may identify a first host vehicle existence response and/or a first detection vehicle existence response, which is calculated by using a weight determined based on at least one of the sensor type, the number of sensors, the reliability of a sensor, the detected area, or any combination thereof used by the first other vehicle to detect the host vehicle and/or detection vehicle.

For example, the weight may be determined to be greater as the number of sensors used to detect the host vehicle and/or the detection vehicle increases. For example, the weight may be determined to be greater as the reliability of data (or sensor fusion data) obtained to detect the host vehicle and/or detection vehicle increases. For example, the weight may be determined to be greater as an area in which the host vehicle and/or the detection vehicle is detected is closer to at least one other vehicle or is closer to the front based on at least one other vehicle.

Figure 2:
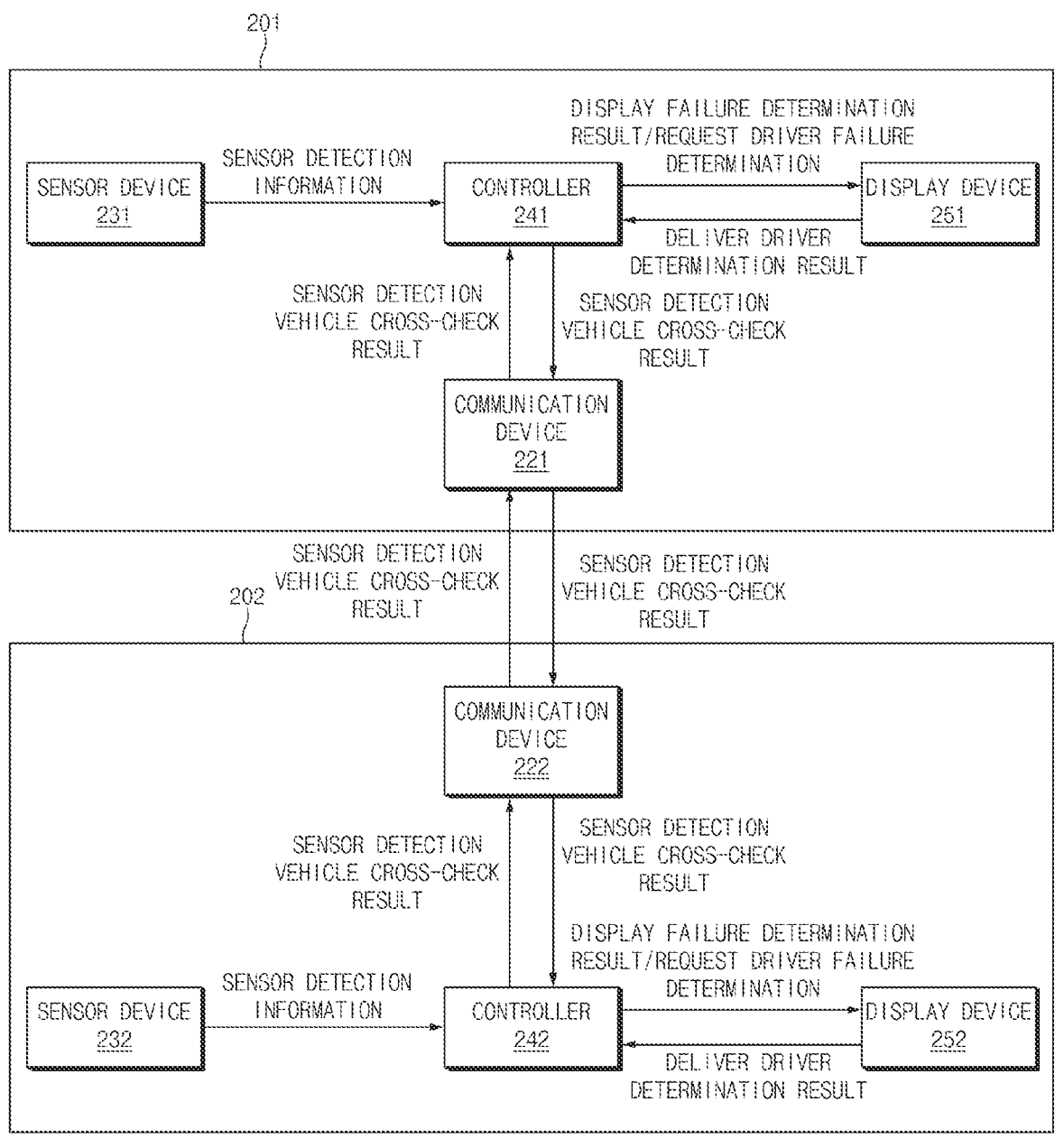
FIG. 2 is a conceptual diagram illustrating an operation between an autonomous driving control apparatus and an external device included in at least one other vehicle according to an embodiment of the present disclosure.

FIG. 2 is a conceptual diagram illustrating an operation between an autonomous driving control apparatus and an external device included in at least one other vehicle according to an embodiment of the present disclosure.

According to an embodiment, a host vehicle autonomous driving control apparatus 201 (or a host vehicle) and another vehicle autonomous driving control apparatus 202 (or another vehicle) may include communication devices 221 and 222, sensor devices 231 and 232, controllers 241 and 242, and/or display devices 251 and 252, respectively.

According to an embodiment, the host vehicle autonomous driving control apparatus 201 (e.g., the autonomous driving control apparatus 100 of FIG. 1) may communicate with the other vehicle autonomous driving control apparatus 202.

Hereinafter, the host vehicle may be defined as a request vehicle and the other vehicle may be defined as a response vehicle.

According to an embodiment, the host vehicle autonomous driving control apparatus 201 and/or the other vehicle autonomous driving control apparatus 202 may control operations of the communication devices 221 and 222, the sensor devices 231 and 232, and/or the display devices 251 and 252 under the control of the controllers 241 and 242.

According to an embodiment, the host vehicle autonomous driving control apparatus 201 may obtain sensor detection information through the sensor device 231. For example, the sensor detection information may include information about an external object (e.g., a detection vehicle) of the host vehicle. When the external object satisfies a specified condition, the host vehicle autonomous driving control apparatus 201 may transmit a cross-check request of the detection vehicle to the other vehicle autonomous driving control apparatus 202 by using the communication device 221. For example, although not shown in the drawings, the host vehicle autonomous driving control apparatus 201 may transmit a cross-check request of the host vehicle.

According to an embodiment, the other vehicle autonomous driving control apparatus 202 may receive a cross-check request of the detection vehicle transmitted from the host vehicle autonomous driving control apparatus 201 by using the communication device 222. For example, the other vehicle autonomous driving control apparatus 202 may obtain sensor detection information for identifying a detection vehicle by using the sensor device 232. For example, the other vehicle autonomous driving control apparatus 202 may transmit a response corresponding to the cross-check request to the host vehicle autonomous driving control apparatus 201 through the communication device 222. For example, the response may include at least one of a host vehicle existence response, a host vehicle absence response, a detection vehicle existence response, a detection vehicle absence response, or any combination thereof.

According to an embodiment, the host vehicle autonomous driving control apparatus 201 may receive a detection vehicle cross-check result (or response) by using the communication device 221. The detection vehicle cross-check result may include at least one of a host vehicle existence response, a host vehicle absence response, a detection vehicle existence response, a detection vehicle absence response, or any combination thereof.

According to an embodiment, the host vehicle autonomous driving control apparatus 201 may determine an operating state of the sensor device 231 and/or whether a detection vehicle is present by using the response received from at least one external device (e.g., at least one other vehicle autonomous driving control apparatus) including the other vehicle autonomous driving control apparatus 202.

For example, when it is identified that the number of host vehicle existence responses received from at least one other vehicle control apparatus including the other vehicle autonomous driving control apparatus 202 is not greater than a value obtained by subtracting 1 from the number of host vehicle absence responses, the host vehicle autonomous driving control apparatus 201 may determine that the operating state of the sensor device 231 is abnormal. In other words, when the number of other vehicles, which have responded that the host vehicle is present, from among at least one other vehicle is not greater than a value obtained by subtracting 1 from the number of other vehicles responding that the host vehicle is not present, the host vehicle autonomous driving control apparatus 201 may determine that the operating state of the sensor device 231 is abnormal.

For example, when it is identified that the number of host vehicle existence responses received from at least one other vehicle control apparatus including the other vehicle autonomous driving control apparatus 202 is greater than a value obtained by subtracting 1 from the number of host vehicle absence responses, the host vehicle autonomous driving control apparatus 201 may determine that the operating state of the sensor device 231 is normal. In other words, when the number of other vehicles, which have responded that the host vehicle is present, from among at least one other vehicle is greater than a value obtained by subtracting 1 from the number of other vehicles responding that the host vehicle is not present, the host vehicle autonomous driving control apparatus 201 may determine that the operating state of the sensor device 231 is normal.

For example, when it is identified that the number of detection vehicle existence responses received from at least one other vehicle control apparatus including the other vehicle autonomous driving control apparatus 202 is greater than a value obtained by subtracting 1 from the number of detection vehicle absence responses, the host vehicle autonomous driving control apparatus 201 may determine that a detection vehicle is present, and then may determine that the operating state of the sensor device 231 is normal. In other words, when the number of other vehicles, which have responded that the detection vehicle is present, from among at least one other vehicle is greater than a value obtained by subtracting 1 from the number of other vehicles responding that the detection vehicle is not present, the host vehicle autonomous driving control apparatus 201 may determine that the operating state of the sensor device 231 is normal and may determine that a detection vehicle is present.

For example, when it is identified that the number of detection vehicle existence responses received from at least one other vehicle control apparatus including the other vehicle autonomous driving control apparatus 202 is less than a value obtained by subtracting 1 from the number of detection vehicle absence responses, the host vehicle autonomous driving control apparatus 201 may determine that the detection vehicle is not present and may determine that the operating state of the sensor device 231 is abnormal. In other words, when the number of other vehicles, which have responded that the detection vehicle is present, from among at least one other vehicle is less than a value obtained by subtracting 1 from the number of other vehicles responding that the detection vehicle is not present, the host vehicle autonomous driving control apparatus 201 may determine that the detection vehicle is not present and may determine that the operating state of the sensor device 231 is abnormal.

For example, when it is identified that the number of detection vehicle existence responses received from at least one other vehicle is the same as a value obtained by subtracting '1' from the number of detection vehicle absence responses, the host vehicle autonomous driving control apparatus 201 may determine whether a detection vehicle is present through a user input. For example, the host vehicle autonomous driving control apparatus 201 may display a user interface including a driver failure determination request (e.g., a request for determining whether a detection vehicle is present) through the display device 251. The user interface may include at least one GUI for a request for determining whether a detection vehicle is present. For example, the host vehicle autonomous driving control apparatus 201 may receive a driver determination result from a driver (or user) through a user interface. For example, when receiving an input indicating that a detection vehicle is present, from a driver, the host vehicle autonomous driving control apparatus 201 may determine that a detection vehicle is present and may determine that the operating state of the sensor device 231 is normal. For example, when receiving an input indicating that a detection vehicle is not present, from the driver through the user interface, the host vehicle autonomous driving control apparatus 201 may determine that a detection vehicle is not present and may determine that the operating state of the sensor device 231 is abnormal. In this case, the host vehicle autonomous vehicle driving control apparatus 201 may display a failure determination result by using the display device 251.

For example, the host vehicle autonomous driving control apparatus 201 may identify a host vehicle existence response and/or a detection vehicle existence response, which is calculated by using a weight determined based on at least one of the sensor type, the number of sensors, the reliability of a sensor, the detected area, or any combination thereof used by the other vehicle autonomous driving control apparatus 202 to detect the host vehicle and/or detection vehicle.

For example, the weight may be determined to be greater as the number of sensors used to detect the host vehicle and/or the detection vehicle increases. For example, the weight may be determined to be greater as the reliability of data (or sensor fusion data) obtained to detect the host vehicle and/or detection vehicle increases. For example, the weight may be determined to be greater as an area in which the host vehicle and/or the detection vehicle is detected is closer to at least one other vehicle or is closer to the front based on at least one other vehicle.

According to an embodiment, the other vehicle autonomous driving control apparatus 202 may calculate an existence possibility expectation area to detect a host vehicle and/or a detection vehicle.

For example, the other vehicle autonomous driving control apparatus 202 may calculate an existence possibility expectation area based on at least one of location information of a request vehicle (or a host vehicle), location information of a detection vehicle, speed information of the request vehicle, speed information of the detection vehicle, the maximum acceleration of the request vehicle, the maximum acceleration of the detection vehicle, the maximum yaw rate of the request vehicle, the maximum yaw rate of the detection vehicle, a communication delay between the request vehicle and a response vehicle, a communication delay between the detection vehicle and the response vehicle, or any combination thereof, may determine whether the request vehicle and/or the detection vehicle is present in the existence possibility expectation area, and may transmit the determination result as a response to the cross-check request to the host vehicle autonomous driving control apparatus 201.

According to an embodiment, the other vehicle autonomous driving control apparatus 202 may perform substantially the same process as the host vehicle autonomous driving control apparatus 201 described above.

For example, the other vehicle autonomous driving control apparatus 202 may transmit a detection vehicle cross-check request to at least one other vehicle by using the communication device 222. Afterward, the other vehicle autonomous driving control apparatus 202 may receive a response to the detection vehicle cross-check request from at least one other vehicle and may determine whether a detection vehicle is present and/or may determine an operating state of the sensor device 232 based on the number of received responses.

Figure 3:
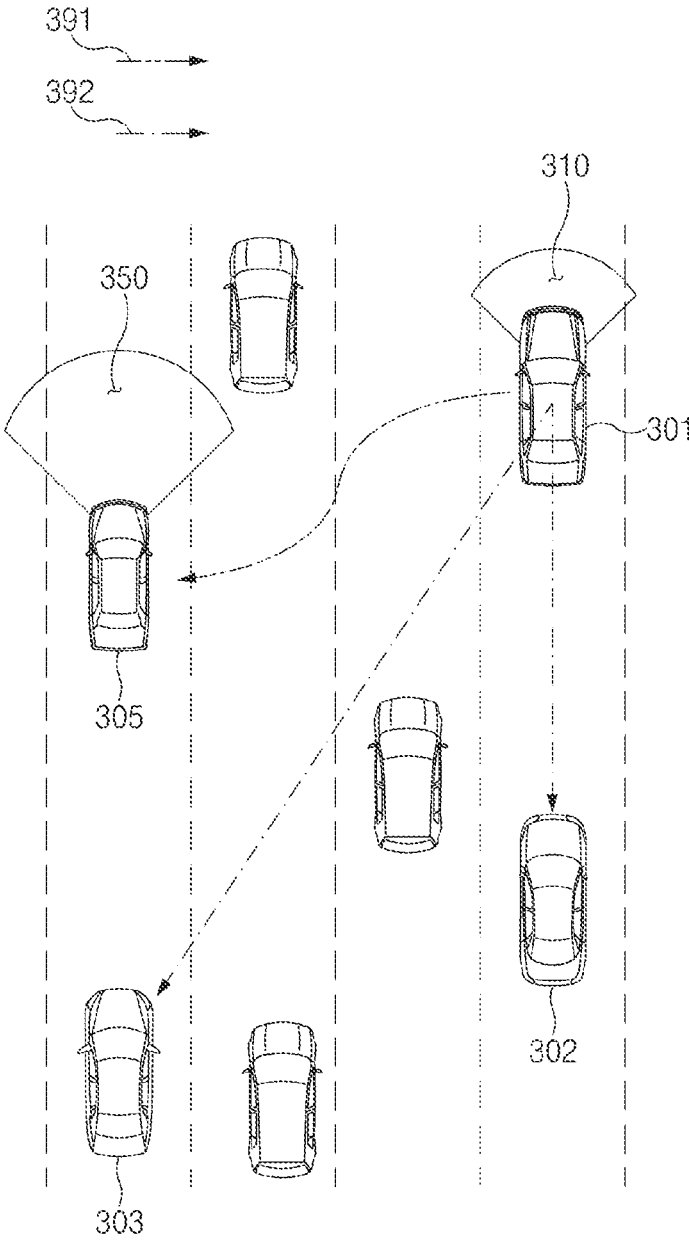
FIG. 3 is a conceptual diagram illustrating an operation of an autonomous driving control apparatus according to an embodiment of the present disclosure.

FIG. 3 is a conceptual diagram illustrating an operation of an autonomous driving control apparatus according to an embodiment of the present disclosure.

According to an embodiment, a request vehicle 301 (or a host vehicle) may detect a detection vehicle 305 that satisfies a specified condition. For example, the request vehicle 301 may detect the detection vehicle 305 through a detection signal according to reference numeral 391 by using a sensor device (e.g., the sensor device 130 in FIG. 1).

According to an embodiment, when the detection vehicle 305 that satisfies the specified condition is detected, the request vehicle 301 may transmit a cross-check request for the request vehicle 301 and/or the detection vehicle 305 to the outside (e.g., the first other vehicle 302 and the second other vehicle 303) according to reference numeral 392.

According to an embodiment, the first other vehicle 302 and/or the second other vehicle 303 may generate an existence possibility expectation area for identification of the host vehicle 301 and/or the detection vehicle 305.

For example, the first other vehicle 302 and/or the second other vehicle 303 may detect whether the request vehicle 301 is present in an existence possibility expectation area 310 of the host vehicle 301. For example, the existence possibility expectation area 310 of the request vehicle 301 may be calculated based on at least one of location information of the request vehicle 301, speed information of the request vehicle 301, the maximum acceleration of the request vehicle 301, the maximum yaw rate of the request vehicle 301, a communication delay between the request vehicle 301 and the first other vehicle 302 and/or the second other vehicle 303, or any combination thereof.

For example, the first other vehicle 302 and/or the second other vehicle 303 may detect whether the request vehicle 301 and the detection vehicle 305 are present in the existence possibility expectation areas 310 and 350 of the request vehicle 301 and the detection vehicle 305. For example, the existence possibility expectation areas 310 and 350 may include a maximum range in which the request vehicle 301 and the detection vehicle 305 are capable of moving based on locations of the request vehicle 301 and the detection vehicle 305 at a point in time when a cross-check request is received.

Figure 4:
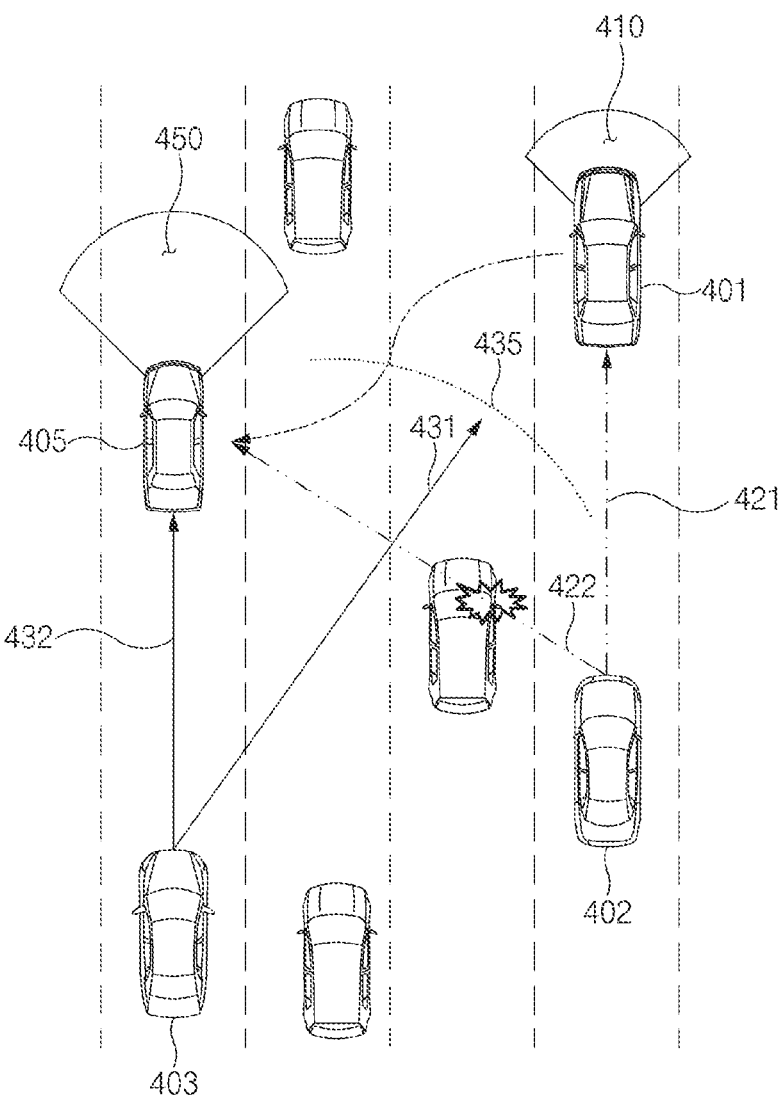
FIG. 4 is a conceptual diagram illustrating an operation of an autonomous driving control apparatus according to an embodiment of the present disclosure.

FIG. 4 is a conceptual diagram illustrating an operation of an autonomous driving control apparatus according to an embodiment of the present disclosure.

According to an embodiment, a request vehicle 401 may detect a detection vehicle 405 that satisfies a specified condition and then may transmit a cross-check request to a first other vehicle 402 and/or a second other vehicle 403.

According to an embodiment, the first other vehicle 402 and/or the second other vehicle 403 may detect whether the request vehicle 401 and the detection vehicle 405 are present in existence possibility expectation areas 410 and 450 of the request vehicle 401 and the detection vehicle 405. For example, the existence possibility expectation areas 410 and 450 may include a maximum range in which the request vehicle 401 and the detection vehicle 405 are capable of moving based on locations of the request vehicle 401 and the detection vehicle 405 at a point in time when a cross-check request is received.

Referring to reference numeral 421, according to an embodiment, the first other vehicle 402 may detect the request vehicle 401. Accordingly, the first other vehicle 402 may transmit a host vehicle existence response to the request vehicle 401.

Referring to reference numeral 422, according to an embodiment, the first other vehicle 402 may not detect the detection vehicle 405 due to an external object (e.g., a vehicle) between the first other vehicle 402 and the detection vehicle 405. Accordingly, the first other vehicle 402 may transmit a detection vehicle absence response to the request vehicle 401.

Referring to reference numeral 431, according to an embodiment, the second other vehicle 403 may fail to detect the request vehicle 401 because a separation distance from the request vehicle 401 exceeds a detectable distance 435. Accordingly, the second other vehicle 403 may transmit a request vehicle detection impossibility response (or a request vehicle absence response) to the request vehicle 401.

Referring to reference numeral 432, according to an embodiment, the second other vehicle 403 may fail to detect the detection vehicle 405 because an operating state of the sensor device is abnormal. Accordingly, the second other vehicle 403 may transmit a detection vehicle detection impossibility response (or detection vehicle absence response) to the request vehicle 401.

According to an embodiment, the request vehicle 401 may determine at least one of a positioning state (or an operating state of a sensor device) of the request vehicle 401, whether the detection vehicle 405 is present, or any combination thereof by comparing the number of received responses.

Figure 5:
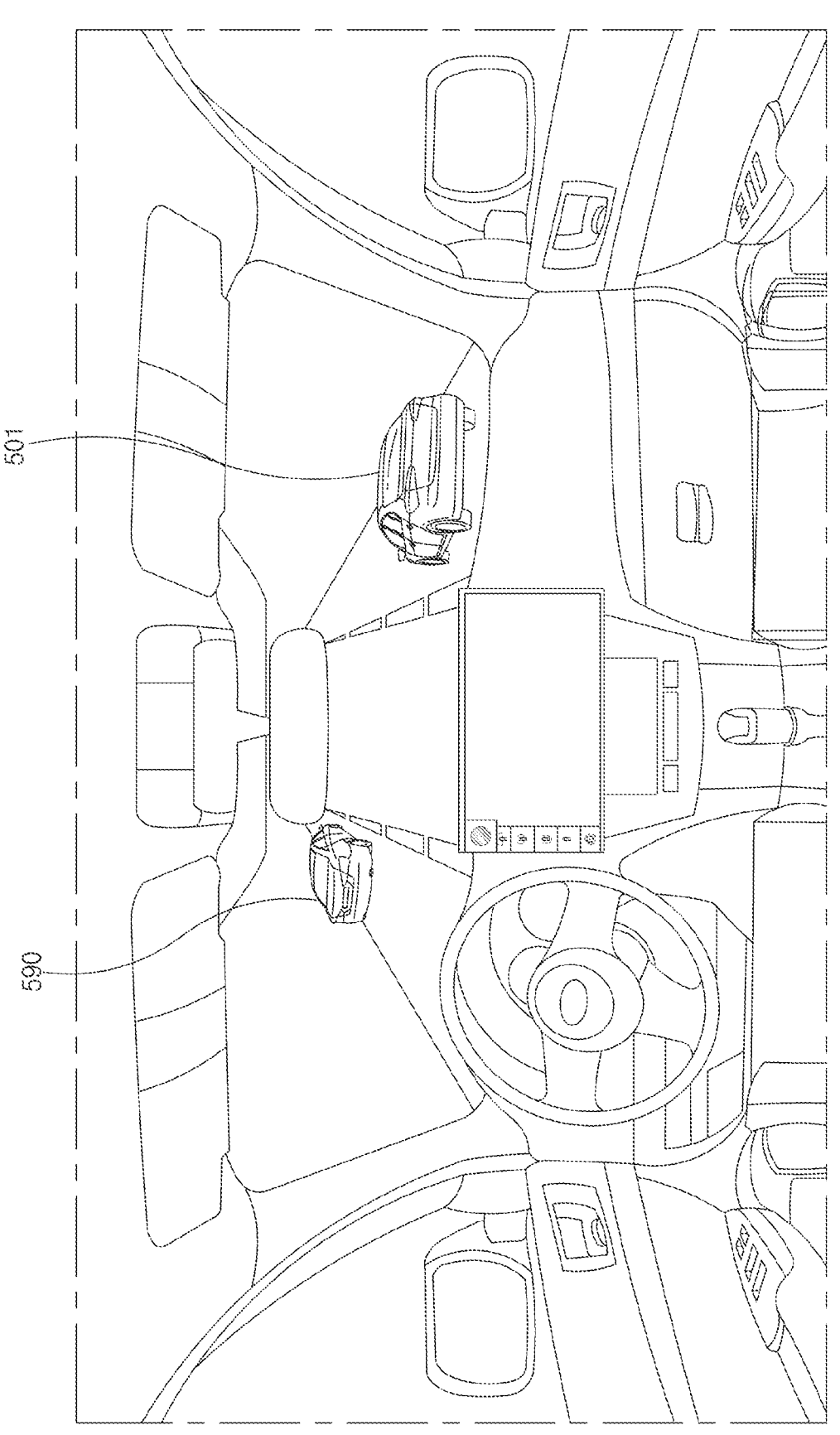
FIG. 5 is a conceptual diagram illustrating an operation of an autonomous driving control apparatus according to an embodiment of the present disclosure.

FIG. 5 is a conceptual diagram illustrating an operation of an autonomous driving control apparatus according to an embodiment of the present disclosure.

According to an embodiment, an autonomous driving control apparatus (e.g., the other vehicle autonomous driving control apparatus 202 of FIG. 2) may provide a user interface for requesting for determining whether a detection vehicle 590 is present in response to receiving a cross-check request.

According to an embodiment, an autonomous driving control apparatus controlling a vehicle according to FIG. 5 may receive a cross-check request transmitted when a request vehicle 501 detects the detection vehicle 590 satisfying a specified condition.

According to an embodiment, in response to receiving the cross-check request from the request vehicle 501, the autonomous driving control apparatus may operate a sensor device to detect the detection vehicle 590.

According to an embodiment, when the detection vehicle 590 is not detected due to a situation including at least one of failure of a sensor device's operating state, exceeding a detectable distance, the existence of an obstruction, or any combination thereof, the autonomous driving control apparatus may display a user interface for requesting a user to determine whether the detection vehicle 590 is present.

For example, the autonomous driving control apparatus may display a user interface for requesting for determining whether the detection vehicle 590 is present on at least one display device included inside a vehicle.

For example, the autonomous driving control apparatus may display an augmented reality (AR) interface corresponding to the detection vehicle 590 on at least one display (e.g., head-up display (HUD)).

Figure 6:
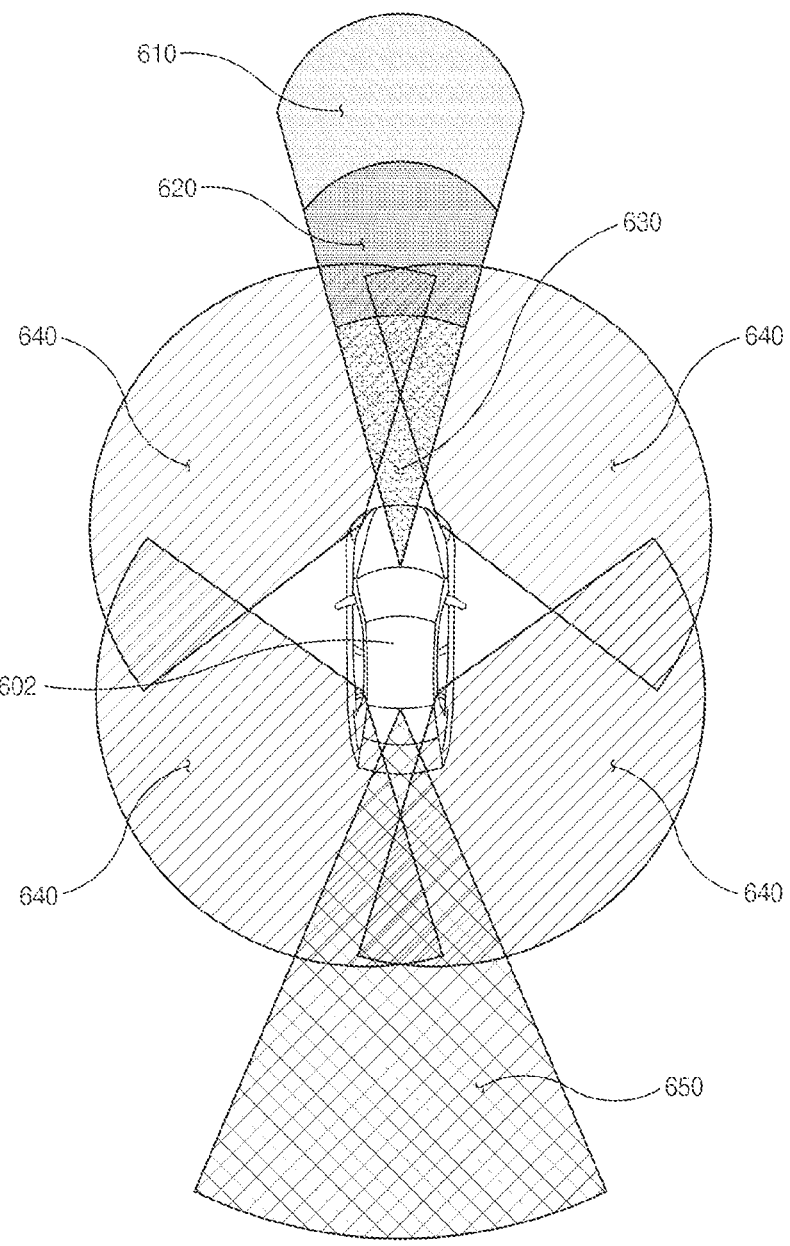
FIG. 6 is a conceptual diagram showing that detection areas capable of being detected by using at least one sensor are distinguished from each other according to an embodiment of the present disclosure.

FIG. 6 is a conceptual diagram showing that detection areas capable of being detected by using at least one sensor are distinguished from each other according to an embodiment of the present disclosure.

According to an embodiment, a vehicle 602 (e.g., the first other vehicle 302 or the second other vehicle 303 in FIG. 3) may obtain data (or sensor fusion data) for a plurality of areas, which are logically and/or physically separated from each other, by using at least one sensor included in a sensor device (e.g., the sensor device 130 in FIG. 1).

According to an embodiment, the vehicle 602 may generate and transmit a response in response to a cross-check request received from the outside (e.g., the host vehicle autonomous driving control apparatus 201 of FIG. 2). For example, the cross-check request may include a request for determining whether a detection vehicle is present. In response to the cross-check request, the vehicle 602 may use at least one sensor included in a sensor device to detect the detection vehicle.

According to an embodiment, the vehicle 602 may obtain data for a first area 610 by using a first sensor set. For example, the first sensor set may include at least one of a front radar, a front camera, a front LiDAR, or any combination thereof. For example, when detecting a detection vehicle included in the first area 610, the vehicle 602 may determine a weight as '1' and may transmit a response generated by using the determined weight to the outside.

According to an embodiment, the vehicle 602 may obtain data for a second area 620 by using a second sensor set. For example, the second sensor set may include at least one of a front radar, a front camera, a front LiDAR, or any combination thereof. For example, when detecting a detection vehicle included in the second area 620, the vehicle 602 may determine a weight as '1.5' and may transmit a response generated by using the determined weight to the outside. For example, because the second area 620 is closer to the vehicle 602 than the first area 610, the vehicle 602 may determine a weight to be higher.

According to an embodiment, the vehicle 602 may obtain data for a third area 630 by using a third sensor set. For example, the third sensor set may include at least one of a front radar, a front camera, a front LiDAR, a corner radar, or any combination thereof. For example, when detecting a detection vehicle included in the third area 630, the vehicle 602 may determine a weight as '2' and may transmit a response generated by using the determined weight to the outside. For example, because the third area 630 is closer to the vehicle 602 than the first area 610 and the second area 620 and the number of sensors used for detection is greater, the vehicle 602 may determine a weight to be higher.

According to an embodiment, the vehicle 602 may obtain data for a fourth area 640 by using a fourth sensor set. For example, the fourth sensor set may include at least one of a corner radar, a corner LiDAR, or any combination thereof. For example, when detecting a detection vehicle included in the fourth area 640, the vehicle 602 may determine a weight as '1' and may transmit a response generated by using the determined weight to the outside. For example, because the number of sensors used to detect the fourth area 640 is smaller than that of the first area 610, the second area 620, and the third area 630, and types of used sensors are different from each other, the vehicle 602 may determine a weight to be lower.

According to an embodiment, the vehicle 602 may obtain data for a fifth area 650 by using a fifth sensor set. For example, the fifth sensor set may include a rear radar. For example, when detecting a detection vehicle included in the fifth area 650, the vehicle 602 may determine a weight as '0.8' and may transmit a response generated by using the determined weight to the outside. For example, because the number of sensors used to detect the fifth area 650 is smaller than that of the first area 610, the second area 620, the third area 630, and the fourth area 640 and types of used sensors are different from each other, the vehicle 602 may determine a weight to be lower.

According to an embodiment, the vehicle 602 may generate a response by using the reliability of at least one sensor included in a sensor set corresponding to an area in which the detection vehicle is detected.

For example, when detecting a detection vehicle included in the first area 610, the vehicle 602 may transmit a response generated by using the different reliability for at least one sensor of the first sensor set to the outside. For example, the front camera may have the reliability of 0.8, the front LiDAR may have the reliability of 0.9, and the front radar may have the reliability of 0.8. In this case, when the vehicle 602 detects a detection vehicle included in the first area 610, the vehicle 602 may generate a response by using the different reliabilities and then may transmit the response to the outside. For example, when detecting that a detection vehicle is present in the first area 610, the vehicle 602 may transmit '2.5', which is generated by adding 0.8, 0.9, and 0.8, as a detection vehicle existence response to the outside.

Figure 7:
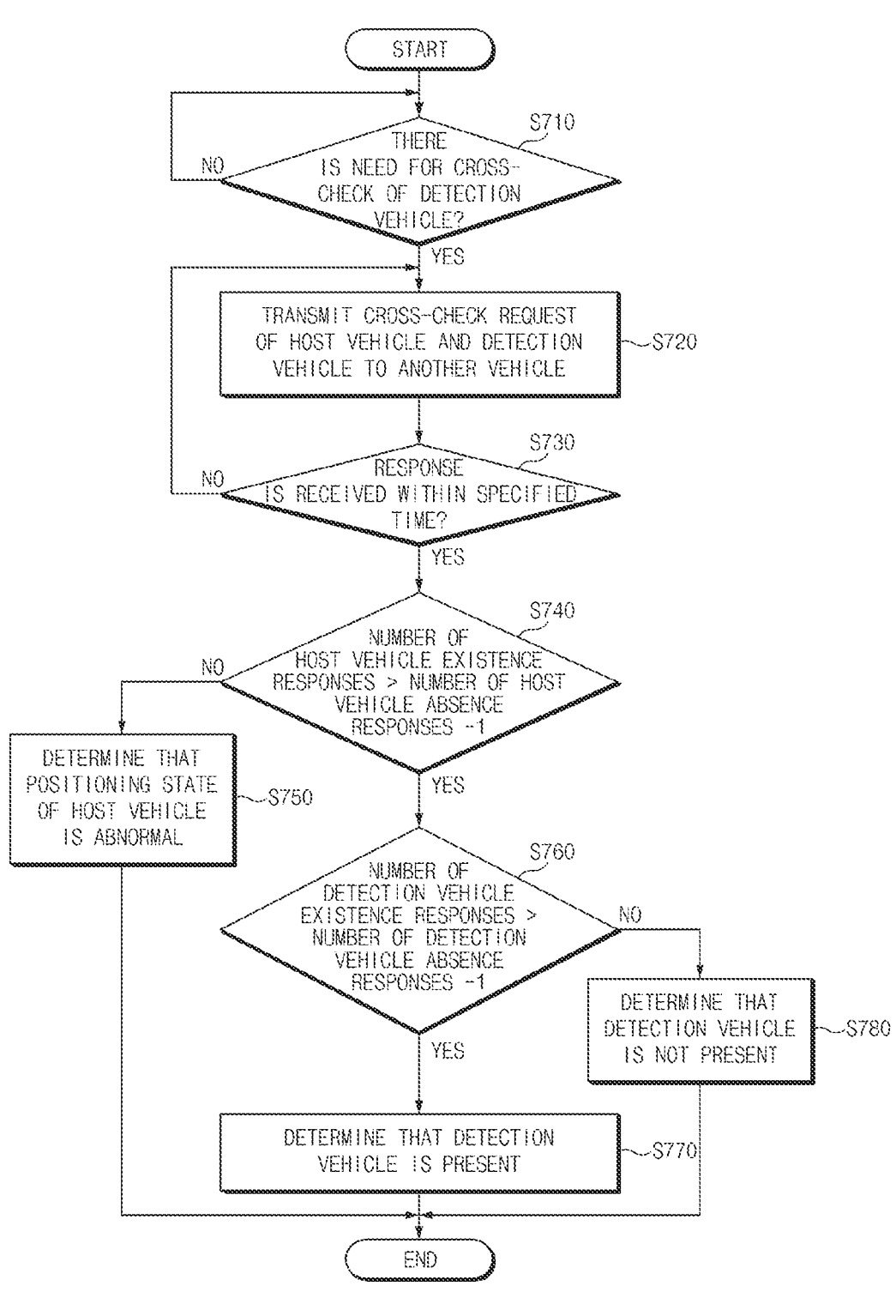
FIG. 7 is an operation flowchart of a request vehicle according to an embodiment of the present disclosure.

FIG. 7 is an operation flowchart of a request vehicle according to an embodiment of the present disclosure.

According to an embodiment, a request vehicle (e.g., the request vehicle 201 of FIG. 2) and/or an autonomous driving control apparatus (e.g., the autonomous driving control apparatus 100 of FIG. 1) may perform operations disclosed in FIG. 7. For example, at least some of the components (e.g., at least one of the memory 110 of FIG. 1, the communication device 120 of FIG. 1, the sensor device 130 of FIG. 1, the controller 140 of FIG. 1, the display device 150 of FIG. 1, the communication device 221 of FIG. 2, the sensor device 231 of FIG. 2, the controller 241 of FIG. 2, the display device 251 of FIG. 2, or any combination thereof) included in the request vehicle and/or the autonomous driving control apparatus may be configured to perform the operations of FIG. 7.

In the following embodiment, S710 to S780 may be sequentially performed, but are not always performed sequentially. For example, the order of operations may be changed, and at least two operations may be performed in parallel. Moreover, descriptions corresponding to or identical to the above-mentioned descriptions given with reference to FIG. 7 may be briefly described or omitted to avoid redundancy.

According to an embodiment, the autonomous driving control apparatus may determine whether there is a need for a cross-check of a detection vehicle (e.g., the detection vehicle 305 in FIG. 3) (S710).

For example, when detecting a detection vehicle that satisfies a specified condition, the autonomous driving control apparatus may determine that there is a need for the cross-check.

For example, the specified condition may include at least one of whether the detected vehicle is a new vehicle, whether sensor fusion data reliability of a sensor device detecting the detection vehicle is not greater than a specified value, whether the detected vehicle is a vehicle stopped on a highway, whether the detected vehicle is a vehicle driving in reverse, whether the detected vehicle is a vehicle violating traffic rules, whether the detected vehicle is a vehicle driving on a shoulder lane, or any combination thereof. In other words, when detecting a detection vehicle that satisfies the specified condition, the autonomous driving control apparatus may determine that there is a need for the cross-check of the detection vehicle according to S710.

For example, when the cross-check of the detection vehicle is required (e.g., S710—Yes), the autonomous driving control apparatus may perform S720.

For example, when the cross-check of the detection vehicle is not required (e.g., S710—No), the autonomous driving control apparatus may repeatedly perform S710.

According to an embodiment, the autonomous driving control apparatus may transmit a cross-check request of a host vehicle and a detection vehicle to another vehicle (S720).

For example, the autonomous driving control apparatus may transmit a cross-check request regarding whether a host vehicle and/or a detection vehicle is present to at least one other vehicle by using a communication device.

For example, the at least one other vehicle may include the other vehicle, which is distinguished from the host vehicle and the detection vehicle, and is adjacent to the host vehicle and the detection vehicle.

According to an embodiment, the autonomous driving control apparatus may determine whether a response is received within a specified time (S730).

For example, when a response corresponding to the cross-check request is received from the at least one other vehicle within the specified time (e.g., S730—Yes), the autonomous driving control apparatus may perform S740.

For example, when the response corresponding to the cross-check request is not received from the at least one other vehicle within the specified time (e.g., S730—No), the autonomous driving control apparatus may perform S720 again. For another example, when the response corresponding to the cross-check request is not received from the at least one other vehicle within the specified time (e.g., S730—No), the autonomous driving control apparatus may determine that it is impossible to determine whether the detection vehicle is present.

According to an embodiment, the autonomous driving control apparatus may determine whether the number of host vehicle existence responses exceeds a value obtained by subtracting '1' from the number of host vehicle absence responses (S740).

For example, when the number of host vehicle existence responses among responses received from at least one other vehicle exceeds the value obtained by subtracting '1' from the number of host vehicle absence responses (e.g., S740—Yes), the autonomous driving control apparatus may perform S760.

For example, when the number of host vehicle existence responses among responses received from at least one other vehicle does not exceed the value obtained by subtracting '1' from the number of host vehicle absence responses (e.g., S740—No), the autonomous driving control apparatus may perform S750.

According to an embodiment, the autonomous driving control apparatus may determine that the positioning state of the host vehicle is abnormal (S750).

For example, the autonomous driving control apparatus may determine that the operating state of the sensor device is abnormal.

According to an embodiment, the autonomous driving control apparatus may determine whether the number of detection vehicle existence responses exceeds a value obtained by subtracting '1' from the number of detection vehicle absence responses (S760).

For example, when the number of detection vehicle existence responses among responses received from at least one other vehicle exceeds the value obtained by subtracting '1' from the number of detection vehicle absence responses (e.g., S760—Yes), the autonomous driving control apparatus may perform S770.

For example, when the number of detection vehicle existence responses among responses received from at least one other vehicle does not exceed the value obtained by subtracting '1' from the number of detection vehicle absence responses (e.g., S760—No), the autonomous driving control apparatus may perform S780.

For example, when the number of detection vehicle existence responses is the same as the number of detection vehicle absence responses, the autonomous driving control apparatus may perform an operation shown in FIG. 8 to be described later.

According to an embodiment, the autonomous driving control apparatus may determine that a detection vehicle is present (S770).

For example, the autonomous driving control apparatus may determine that the operating state of the sensor device is normal and may determine that the detection vehicle detected by the autonomous driving control apparatus is present.

According to an embodiment, the autonomous driving control apparatus may determine that a detection vehicle is not present (S780).

For example, the autonomous driving control apparatus may determine that the operating state of the sensor device is abnormal and may determine that the detection vehicle detected by the autonomous driving control apparatus is not present.

Figure 8:
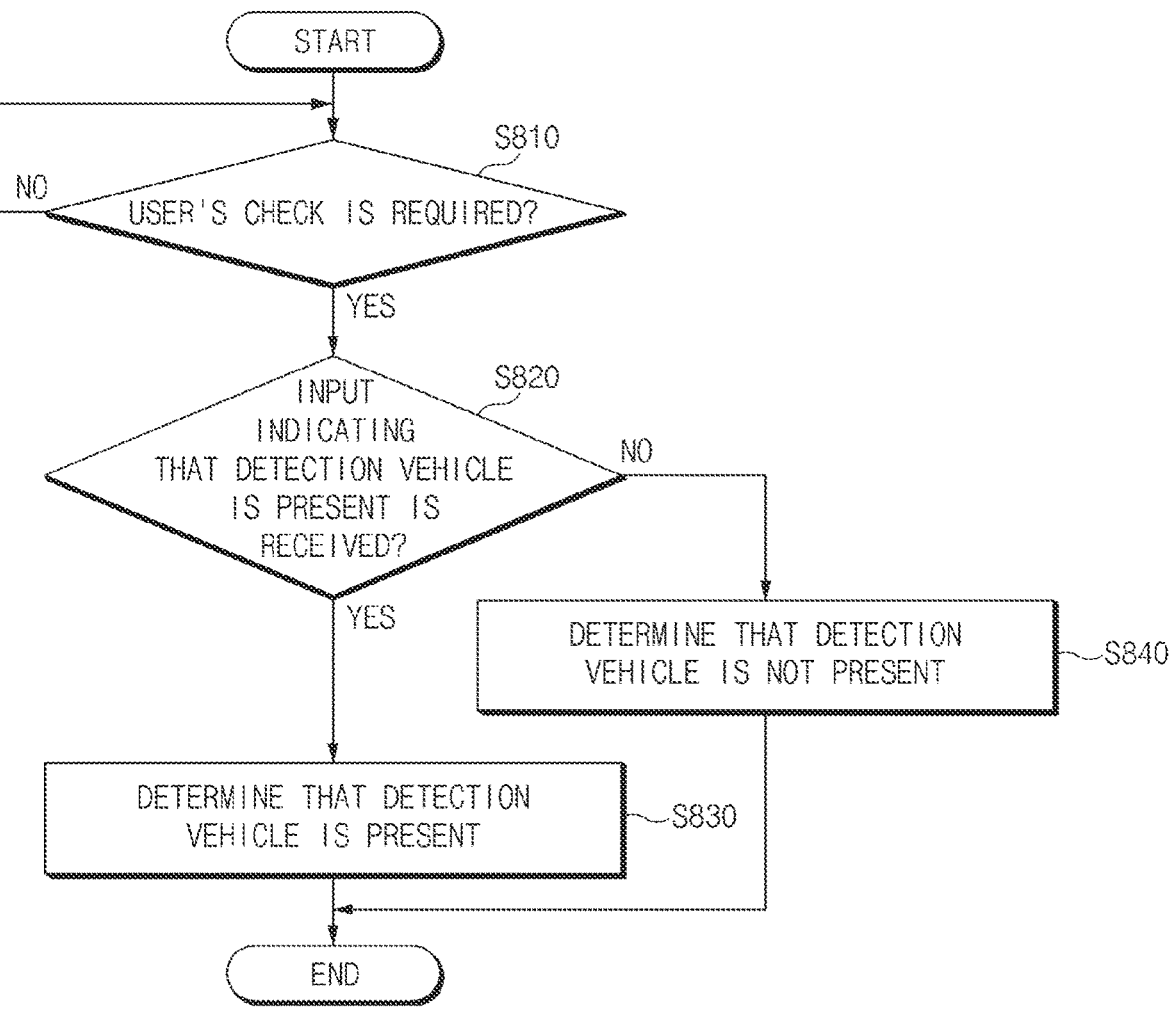
FIG. 8 is an operation flowchart of a request vehicle according to an embodiment of the present disclosure.

FIG. 8 is an operation flowchart of a request vehicle according to an embodiment of the present disclosure.

According to an embodiment, a request vehicle (e.g., the request vehicle 201 of FIG. 2) and/or an autonomous driving control apparatus (e.g., the autonomous driving control apparatus 100 of FIG. 1) may perform operations disclosed in FIG. 8. For example, at least some of the components (e.g., at least one of the memory 110 of FIG. 1, the communication device 120 of FIG. 1, the sensor device 130 of FIG. 1, the controller 140 of FIG. 1, the display device 150 of FIG. 1, the communication device 221 of FIG. 2, the sensor device 231 of FIG. 2, the controller 241 of FIG. 2, the display device 251 of FIG. 2, or any combination thereof) included in the request vehicle and/or the autonomous driving control apparatus may be configured to perform the operations of FIG. 8.

In the following embodiment, S810 to S840 may be sequentially performed, but are not always performed sequentially. For example, the order of operations may be changed, and at least two operations may be performed in parallel. Moreover, descriptions corresponding to or identical to the above-mentioned descriptions given with reference to FIG. 8 may be briefly described or omitted to avoid redundancy.

According to an embodiment, the request vehicle may determine whether a user's check is required (S810).

For example, the request vehicle may detect a detection vehicle that satisfies a specified condition, may transmit a cross-check request to at least one other vehicle (e.g., at least one response vehicle), and may determine whether there is a need for the user's check regarding whether the detection vehicle is present based on the response received from at least one other vehicle in response to the cross-check request.

For example, when the detection vehicle existence response and the detection vehicle absence response are the same as each other among responses received from at least one other vehicle, the request vehicle may determine that the user's check is required.

For example, when the user's check is required (e.g., S810—Yes), the request vehicle may perform S820.

For example, when the user's check is not required (e.g., S810—No), the request vehicle may repeatedly perform S810.

According to an embodiment, the request vehicle may determine whether an input indicating that a detection vehicle is present is received (S820).

For example, when it is determined that the user's check is required, the request vehicle may display a user interface for requesting for determining whether the detection vehicle is present, through a display device, and may receive a user input regarding whether the detection vehicle is present, through the user interface.

For example, the user interface may include at least one GUI regarding whether a detection vehicle is present. For example, the user interface may include one or more icons corresponding to the presence of a detection vehicle and the absence of a detection vehicle.

For example, when the user input regarding whether the detection vehicle is present is received (e.g., S820—Yes), the request vehicle may perform S830.

For example, when the user input regarding whether the detection vehicle is present is not received (alternatively, when the user input regarding whether the detection vehicle is not present is received) (e.g., S820—No), the request vehicle may perform S840.

According to an embodiment, the request vehicle may determine that a detection vehicle is present (S830).

For example, the request vehicle may determine that a detection vehicle is present and that the operating state of the sensor device of the request vehicle is normal.

According to an embodiment, the request vehicle may determine that a detection vehicle is not present (S840).

For example, the request vehicle may determine that a detection vehicle is not present and that the operating state of the sensor device of the request vehicle is abnormal.

Figure 9:
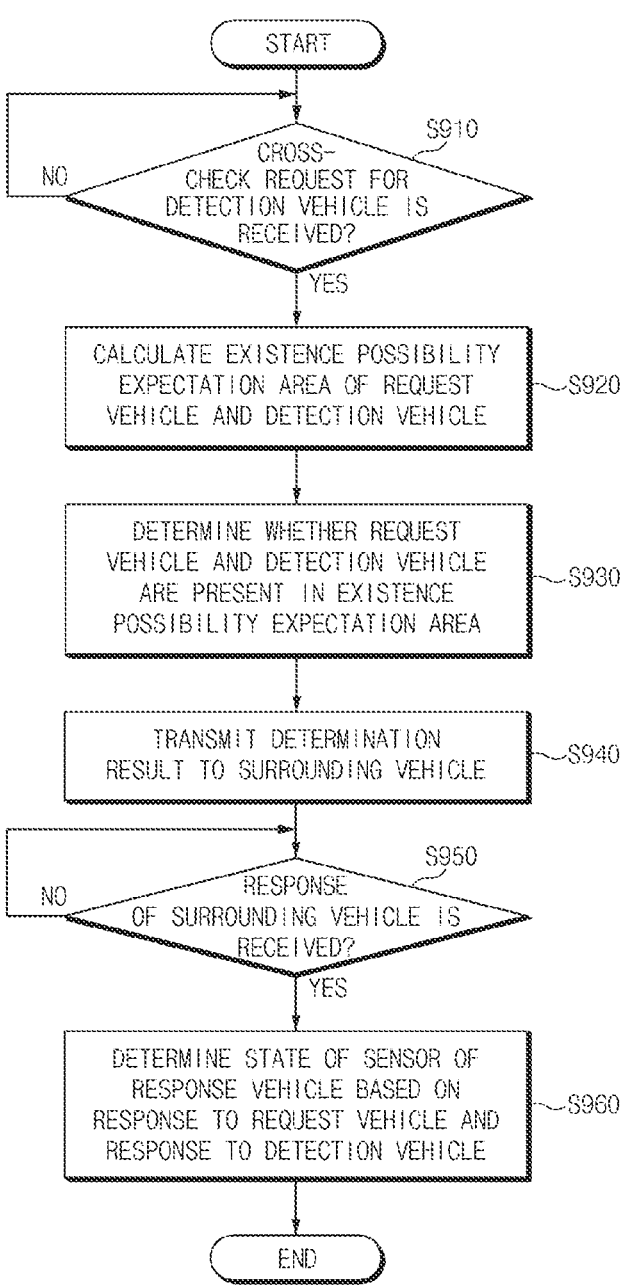
FIG. 9 is an operation flowchart of a response vehicle according to an embodiment of the present disclosure.

FIG. 9 is an operation flowchart of a response vehicle according to an embodiment of the present disclosure.

According to an embodiment, a response vehicle (e.g., the response vehicle 202 of FIG. 2) (or an autonomous driving control apparatus that controls the response vehicle) may perform operations disclosed in FIG. 9. For example, at least some of the components (or components included in the autonomous driving control apparatus that controls the response vehicle) (e.g., at least one of the communication device 222, the sensor device 232, the controller 242, the display device 252, or any combination thereof in FIG. 2) included in the response vehicle may be configured to perform the operations of FIG. 9.

In the following embodiment, S910 to S960 may be sequentially performed, but are not always performed sequentially. For example, the order of operations may be changed, and at least two operations may be performed in parallel. Moreover, descriptions corresponding to or identical to the above-mentioned descriptions given with reference to FIG. 9 may be briefly described or omitted to avoid redundancy.

According to an embodiment, the response vehicle may identify whether a cross-check request for a detection vehicle is received (S910).

For example, the response vehicle may determine whether a cross-check request for determining whether a detection vehicle and/or a request vehicle is present is received from a request vehicle (e.g., the request vehicle 301 in FIG. 3).

For example, when the cross-check request is received (e.g., S910—Yes), the response vehicle may perform S920.

For example, when the cross-check request is not received (e.g., S910—No), the response vehicle may repeatedly perform S910.

According to an embodiment, the response vehicle may calculate an existence possibility expectation area of the request vehicle and the detection vehicle (S920).

For example, the existence possibility expectation area (e.g., the existence possibility expectation areas 310 and 350 of FIG. 3) may be calculated based on at least one of location information of a request vehicle and/or a detection vehicle, speed information of the request vehicle and/or the detection vehicle, a maximum acceleration of the request vehicle and/or the detection vehicle, a maximum yaw rate of the request vehicle and/or the detection vehicle, a communication delay between a response vehicle and the request vehicle and/or the detection vehicle, or any combination thereof. For example, the existence possibility expectation area may include a maximum range in which a request vehicle and a detection vehicle are capable of moving based on locations of the request vehicle and the detection vehicle at a point in time when the cross-check request is received.

According to an embodiment, the response vehicle may determine whether the request vehicle and the detection vehicle are present in the existence possibility expectation area (S930).

For example, the response vehicle may generate the determination result by detecting whether the request vehicle is present in the existence possibility expectation area of the request vehicle and whether the detection vehicle is present in the existence possibility expectation area of the detection vehicle.

For example, the determination result may include at least one of a request vehicle existence response, a request vehicle absence response, a detection vehicle existence response, a detection vehicle absence response, or any combination thereof.

According to an embodiment, the response vehicle may transmit the determination result to a surrounding vehicle (S940).

For example, the response vehicle may transmit the determination result to at least part of other adjacent vehicles including the request vehicle.

According to an embodiment, the response vehicle may determine whether a response of a surrounding vehicle is received (S950).

For example, the response vehicle may transmit a cross-check request together with the determination result to the surrounding vehicle.

For example, the response vehicle may transmit, to the surrounding vehicle, a cross-check request regarding whether a request vehicle and/or a detection vehicle is present.

For example, the response vehicle may transmit a cross-check request to a surrounding vehicle and may determine whether a response corresponding to the cross-check request is received. For example, the surrounding vehicle may be another vehicle included in at least one other vehicle among which an initial request vehicle transmits the cross-check request.

For example, when a response is received from the surrounding vehicle (e.g., S950—Yes), the response vehicle may perform S960.

For example, when the response is not received from the surrounding vehicle (e.g., S950—No), the response vehicle may repeatedly perform S950. For another example, when the response corresponding to the cross-check request is not received from the surrounding vehicle within the specified time (e.g., S950—No), the response vehicle may determine that it is impossible to determine whether the request vehicle and/or the detection vehicle is present.

According to an embodiment, the response vehicle may determine whether a request vehicle and/or a detection vehicle is present based on the response to the request vehicle and the response to the detection vehicle (S960).

For example, in a situation where the response vehicle determines that the request vehicle is present, when the number of request vehicle existence responses among responses received from the surrounding vehicle exceeds a value obtained by subtracting '1' from the number of request vehicle absence responses, the response vehicle may determine that the sensor state of the response vehicle is normal and the request vehicle is present.

For example, in a situation where the response vehicle determines that the request vehicle is present, when the number of request vehicle existence responses among the responses received from the surrounding vehicle is less than a value obtained by subtracting '1' from the number of request vehicle absence responses, the response vehicle may determine that the sensor state of the response vehicle is abnormal.

For example, in a situation where the response vehicle determines that the request vehicle is present, when the number of request vehicle existence responses among the responses received from the surrounding vehicle is the same as a value obtained by subtracting '1' from the number of request vehicle absence responses, the response vehicle may provide a user interface for determining whether a request vehicle is present to a user through a display device, may receive a user input for the user interface, and may determine the operating state of a sensor based on the user input.

For example, in a situation where the response vehicle determines that the request vehicle is not present, when the number of request vehicle existence responses among responses received from the surrounding vehicle is greater than a value obtained by subtracting '1' from the number of request vehicle absence responses, the response vehicle may determine that the sensor state of the response vehicle is abnormal.

For example, in a situation where the response vehicle determines that the request vehicle is not present, when the number of request vehicle existence responses among responses received from the surrounding vehicle is less than a value obtained by subtracting '1' from the number of request vehicle absence responses, the response vehicle may determine that the sensor state of the response vehicle is normal.

For example, in a situation where the response vehicle determines that the request vehicle is not present, when the number of request vehicle existence responses among responses received from the surrounding vehicle is the same as a value obtained by subtracting '1' from the number of request vehicle absence responses, the response vehicle may provide a user interface for determining whether a request vehicle is present to a user through a display device, may receive a user input for the user interface, and may determine the operating state of a sensor based on the user input.

For example, in a situation where the response vehicle determines that the detection vehicle is present, when the number of detection vehicle existence responses among the responses received from the surrounding vehicle exceeds a value obtained by subtracting '1' from the number of detection vehicle absence responses, the response vehicle may determine that the sensor state of the response vehicle is normal.

For example, in a situation where the response vehicle determines that the detection vehicle is present, when the number of detection vehicle existence responses among the responses received from the surrounding vehicle is less than a value obtained by subtracting '1' from the number of detection vehicle absence responses, the response vehicle may determine that the sensor state of the response vehicle is abnormal.

For example, in a situation where the response vehicle determines that the detection vehicle is present, when the number of detection vehicle existence responses among the responses received from the surrounding vehicle is the same as a value obtained by subtracting '1' from the number of detection vehicle absence responses, the response vehicle may provide a user interface for determining whether a request vehicle is present to a user through a display device, may receive a user input for the user interface, and may determine the operating state of a sensor based on the user input.

For example, in a situation where the response vehicle determines that the detection vehicle is not present, when the number of detection vehicle existence responses among the responses received from the surrounding vehicle exceeds a value obtained by subtracting '1' from the number of detection vehicle absence responses, the response vehicle may determine that the sensor state of the response vehicle is abnormal.

For example, in a situation where the response vehicle determines that the detection vehicle is not present, when the number of detection vehicle existence responses among the responses received from the surrounding vehicle is less than a value obtained by subtracting '1' from the number of detection vehicle absence responses, the response vehicle may determine that the sensor state of the response vehicle is normal.

For example, in a situation where the response vehicle determines that the detection vehicle is not present, when the number of detection vehicle existence responses among the responses received from the surrounding vehicle is the same as a value obtained by subtracting '1' from the number of detection vehicle absence responses, the response vehicle may provide a user interface for determining whether a request vehicle is present to a user through a display device, may receive a user input for the user interface, and may determine the operating state of a sensor based on the user input.

In the above-described embodiment, the number of responses used by the response vehicle to determine a sensor state may include the detection result of the response vehicle.

Figure 10:
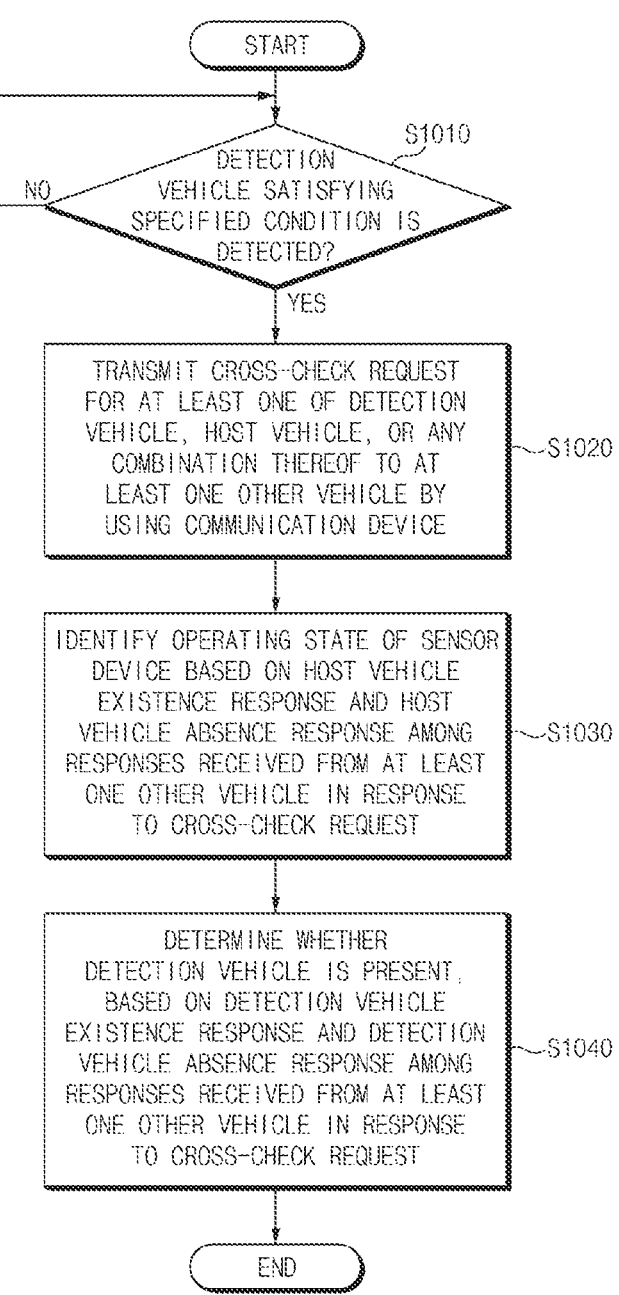
FIG. 10 is an operation flowchart of an autonomous driving control apparatus according to an embodiment of the present disclosure.

FIG. 10 is an operation flowchart of an autonomous driving control apparatus according to an embodiment of the present disclosure.

According to an embodiment, an autonomous driving control apparatus (e.g., the autonomous driving control apparatus 100 of FIG. 1) may perform operations described in FIG. 10. For example, at least some of the components (e.g., at least one of the memory 110 of FIG. 1, the communication device 120 of FIG. 1, the sensor device 130 of FIG. 1, the controller 140 of FIG. 1, the display device 150 of FIG. 1, or any combination thereof) included in the autonomous driving control apparatus may be configured to perform the operations of FIG. 10.

In the following embodiment, S1010 to S1040 may be sequentially performed, but are not always performed sequentially. For example, the order of operations may be changed, and at least two operations may be performed in parallel. Moreover, descriptions corresponding to or identical to the above-mentioned descriptions given with reference to FIG. 10 may be briefly described or omitted to avoid redundancy.

According to an embodiment, the autonomous driving control apparatus may determine whether a detection vehicle satisfying a specified condition is detected (S1010).

For example, the specified condition may include at least one of whether the detected vehicle is a new vehicle, whether the reliability of the sensor fusion data of a sensor device detecting the detection vehicle is not greater than a specified value, whether a vehicle is stopped on a highway, whether a vehicle is driving in reverse, whether a vehicle has violated traffic rules, whether a vehicle is driving on a shoulder lane, or any combination thereof. For example, the autonomous driving control apparatus may identify that a vehicle, which satisfies at least one of the above-described conditions, from among detected vehicles is the detection vehicle. In other words, the autonomous driving control apparatus may detect a vehicle driving in an abnormal driving state as a detection vehicle.

For example, when the detection vehicle satisfying the specified condition is detected (e.g., S1010—Yes), the autonomous driving control apparatus may perform S1020.

For example, when the detection vehicle satisfying the specified condition is not detected (e.g., S1010—No), the autonomous driving control apparatus may repeatedly perform S1010.

According to an embodiment, the autonomous driving control apparatus may transmit a cross-check request for at least one of a detection vehicle, a host vehicle, or any combination thereof to at least one other vehicle by using a communication device (S1020).

For example, the autonomous driving control apparatus may transmit, to the at least one other vehicle, a cross-check request including at least one of location information of the host vehicle, location information of the detection vehicle, speed information of the host vehicle, speed information of the detection vehicle, or any combination thereof.

For example, the autonomous driving control apparatus may further transmit at least one of the maximum acceleration of the host vehicle, the maximum acceleration of the detection vehicle, the maximum yaw rate of the host vehicle, the maximum yaw rate of the detection vehicle, a communication delay between the host vehicle and at least one other vehicle, a communication delay between the detection vehicle and at least one other vehicle, or any combination thereof. The at least one other vehicle may calculate an existence possibility expectation area corresponding to each of the host vehicle and/or the detection vehicle by using at least part of the above-described transmission data. The at least one other vehicle may transmit, to the host vehicle (or an autonomous driving control apparatus), a response including the determination result regarding whether the host vehicle and/or the detection vehicle is present in the existence possibility expectation area as a response signal to the cross-check request.

For example, the response received from the at least one other vehicle may include at least one of a host vehicle existence response, a host vehicle absence response, a detection vehicle existence response, a detection vehicle absence response, or any combination thereof. For example, the response may be calculated by using different weights determined based on at least one of a type of a sensor, the number of sensors, the reliability of the sensor, a detected area, or any combination thereof, which is used by the at least one other vehicle to detect whether at least one of the host vehicle, the detection vehicle, or any combination thereof is present.

According to an embodiment, the autonomous driving control apparatus may identify an operating state of a sensor device based on the host vehicle existence response and the host vehicle absence response among responses received from the at least one other vehicle in response to the cross-check request (S1030).

For example, when it is identified that the number of host vehicle existence responses is not greater than a value obtained by subtracting '1' from the number of host vehicle absence responses, the autonomous driving control apparatus may determine that the operating state of the sensor device is abnormal.

For example, when it is identified that the number of host vehicle existence responses is greater than a value obtained by subtracting '1' from the number of host vehicle absence responses, the autonomous driving control apparatus may determine that the operating state of the sensor device is normal.

According to an embodiment, the autonomous driving control apparatus may determine whether a detection vehicle is present based on a detection vehicle existence response and a detection vehicle absence response among responses received from at least one other vehicle in response to the cross-check request (S1040).

For example, the autonomous driving control apparatus may further determine the operating state of the sensor device together with the presence or absence of the detection vehicle.

When it is identified that the number of detection vehicle existence responses is greater than a value obtained by subtracting '1' from the number of detection vehicle absence responses, the autonomous driving control apparatus may determine that the detection vehicle is present and may determine that the operating state of the sensor device is normal.

When it is identified that the number of detection vehicle existence responses is less than a value obtained by subtracting '1' from the number of detection vehicle absence responses, the autonomous driving control apparatus may determine that the detection vehicle is not present and may determine that the operating state of the sensor device is abnormal.

For example, when the number of detection vehicle existence responses is the same as the number of detection vehicle absence responses, the autonomous driving control apparatus may display a user interface for requesting for determining whether a detection vehicle is present through a display device.

For example, when receiving an input indicating that a detection vehicle is present, from a user through the user interface, the autonomous driving control apparatus may determine that a detection vehicle is present and may determine that the operating state of the sensor device is normal.

For example, when receiving an input indicating that a detection vehicle is not present, from the user through the user interface, the autonomous driving control apparatus may determine that a detection vehicle is not present and may determine that the operating state of the sensor device is abnormal.

Figure 11:
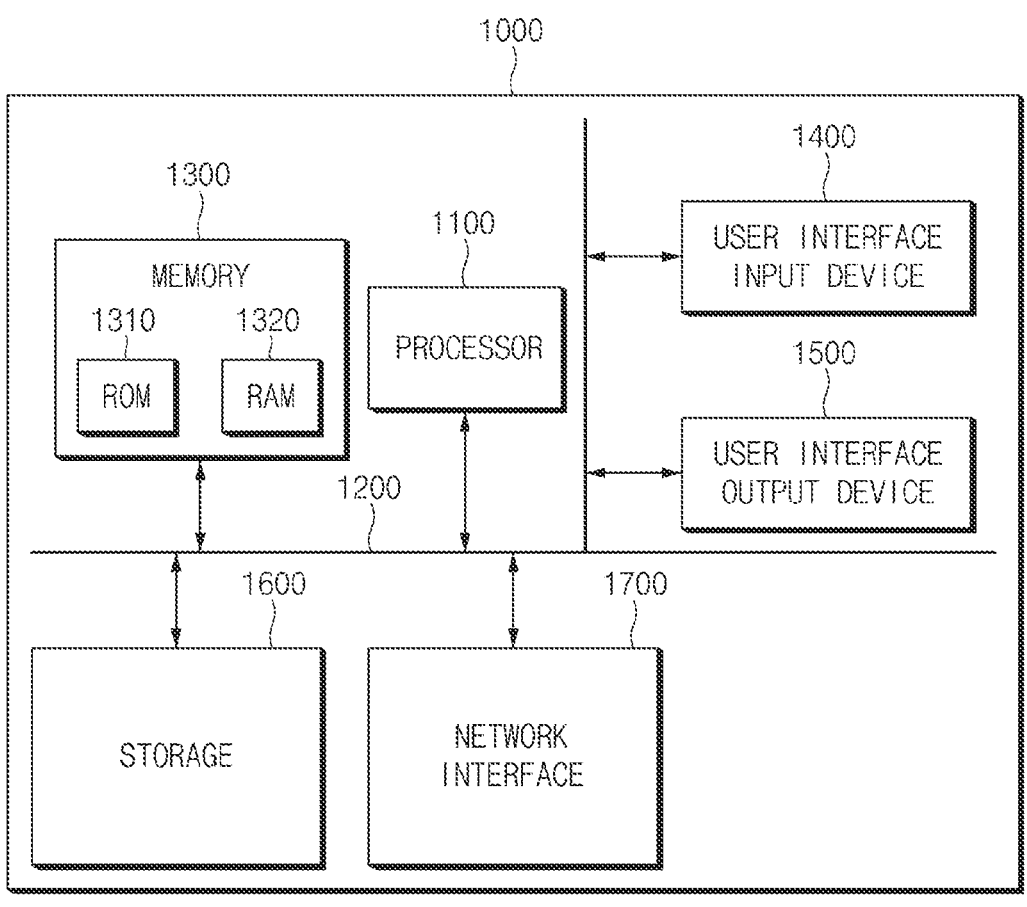
FIG. 11 illustrates a computing system related to an autonomous driving control method according to an embodiment of the present disclosure.

FIG. 11 illustrates a computing system related to an autonomous driving control method according to an embodiment of the present disclosure.

Referring to FIG. 11, a computing system 1000 related to an autonomous driving control method may include at least one processor 1100, a memory 1300, a user interface input device 1400, a user interface output device 1500, a memory (i.e., a storage) 1600, and a network interface 1700, which are connected with each other via a bus 1200.

The processor 1100 may be a central processing unit (CPU) or a semiconductor device that processes instructions stored in the memory 1300 and/or the memory 1600. Each of the memory 1300 and the memory 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the memory 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical ideas of embodiments of the present disclosure, and various modifications and modifications may be made by one skilled in the art without departing from the essential characteristics of embodiments of the present disclosure.

Accordingly, exemplary embodiments of the present disclosure are intended not to limit but to explain the technical ideas of embodiments of the present disclosure, and the scope and spirit of the present disclosure is not limited by the above embodiments. The scope of protection of embodiments of the present disclosure should be construed by the attached claims, and all equivalents thereof should be construed as being included within the scope.

Descriptions of an autonomous driving control apparatus according to embodiments of the present disclosure and a method thereof are as follows.

According to at least one of the embodiments of the present disclosure, a sensor state may be accurately identified in real time by mutually verifying the determination result of an autonomous driving control apparatus and the determination result of at least one external device (e.g., an autonomous driving control apparatus installed in at least one other vehicle).

Moreover, according to at least one of the embodiments of the present disclosure, the sensor state may be identified by determining an external environment (e.g., whether a detection vehicle is present) by using a user's (or driver's) cognitive state when it is difficult to accurately identify the sensor state even as the determination result of at least one external device.

Furthermore, according to at least one of the embodiments of the present disclosure, an external environment may be accurately determined by determining whether a detection vehicle is present by further using a weight determined based on at least one of the type of a sensor sensing a detection vehicle, the number of sensors, the reliability of a sensor, an area in which the detection vehicle is sensed, or any combination thereof.

Besides, a variety of effects directly or indirectly understood through the specification may be provided.

Hereinabove, although embodiments of the present disclosure have been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous driving control apparatus, the apparatus comprising:
   a communication device;
   a sensor device;
   a memory storing instructions; and
   a controller operatively connected to the communication device, the sensor device, and the memory, wherein the controller is configured to execute the instructions stored in the memory to cause the autonomous driving control apparatus to:
      transmit, using the communication device, a cross-check request for a detection vehicle or a host vehicle to another vehicle in response to detection of the detection vehicle satisfying a specified condition by using the sensor device;
      determine that an operating state of the sensor device is normal based on a number of host vehicle existence responses being equal to or greater than a number of host vehicle absence responses among responses received from the other vehicle in response to the cross-check request;
      determine that the detection vehicle is present and the operating state of the sensor device is normal based on a number of detection vehicle existence responses being equal to or greater than a number of detection vehicle absence responses among the responses received from the other vehicle in response to the cross-check request; and
   control autonomous driving of the host vehicle based on the operation state of the sensor device and the detection vehicle being present.

2. The apparatus of claim 1, wherein the controller is configured to execute the instructions stored in the memory to cause the autonomous driving control apparatus to transmit, to the other vehicle, the cross-check request including location information of the host vehicle, location information of the detection vehicle, speed information of the host vehicle, speed information of the detection vehicle, or a combination of two or more of the location information of the host vehicle, the location information of the detection vehicle, the speed information of the host vehicle, and the speed information of the detection vehicle.

3. The apparatus of claim 1, wherein the responses received from the other vehicle comprise information about whether the host vehicle or the detection vehicle is present in an existence possibility expectation area calculated based on location information of the host vehicle, location information of the detection vehicle, speed information of the host vehicle, speed information of the detection vehicle, a maximum acceleration of the host vehicle, a maximum acceleration of the detection vehicle, a maximum yaw rate of the host vehicle, a maximum yaw rate of the detection vehicle, a communication delay between the host vehicle and the other vehicle, or a communication delay between the detection vehicle and the other vehicle.

4. The apparatus of claim 1, wherein the specified condition comprises whether a vehicle is new, whether sensor fusion data reliability of the sensor device is not greater than a specified value, whether the vehicle is stopped on a highway, whether the vehicle is driving in reverse, whether the vehicle violates a traffic rule, or whether the vehicle is driving on a shoulder lane.

5. The apparatus of claim 1, wherein the controller is configured to execute the instructions stored in the memory to cause the autonomous driving control apparatus to determine that the operating state of the sensor device is abnormal in response to a determination that the number of the host vehicle existence responses is not greater than a value obtained by subtracting '1' from the number of the host vehicle absence responses.

6. The apparatus of claim 1, wherein the controller is configured to execute the instructions stored in the memory to cause the autonomous driving control apparatus to determine that the detection vehicle is present and determine that the operating state of the sensor device is normal in response to a determination that the number of the detection vehicle existence responses is greater than a value obtained by subtracting '1' from the number of the detection vehicle absence responses.

7. The apparatus of claim 1, wherein the controller is configured to execute the instructions stored in the memory to cause the autonomous driving control apparatus to determine that the detection vehicle is not present and determine that the operating state of the sensor device is abnormal in response to a determination that the number of the detection vehicle existence responses is less than a value obtained by subtracting '1' from the number of the detection vehicle absence responses.

8. The apparatus of claim 1, further comprising a display device, wherein the controller is configured to execute the instructions stored in the memory to cause the autonomous driving control apparatus to:
   display a user interface for requesting a determination of whether the detection vehicle is present, through the display device, in response to the number of the detection vehicle existence responses being the same as the number of the detection vehicle absence responses;
   determine that the detection vehicle is present and determine that the operating state of the sensor device is normal in response to receiving a first input indicating that the detection vehicle is present through the user interface; and
   determine that the detection vehicle is not present and determine that the operating state of the sensor device is abnormal in response to receiving a second input indicating that the detection vehicle is not present through the user interface.

9. The apparatus of claim 1, wherein the host vehicle existence response, the host vehicle absence response, the detection vehicle existence response, or the detection vehicle absence response is calculated by using a different weight determined based on a type of a sensor, the number of sensors, reliability of the sensor, or a detected area used by the other vehicle to detect whether the host vehicle or the detection vehicle is present.

10. An autonomous driving control system, the system comprising:

a request vehicle configured to, in response to a detection vehicle satisfying a specified condition being detected, transmit a cross-check request for the detection vehicle or a request vehicle to an outside and to identify an operating state of a sensor device or to determine whether the detection vehicle is present based on a detection vehicle existence response, a detection vehicle absence response, a request vehicle existence response, or a request vehicle absence response received in response to the cross-check request; and a response vehicle configured to receive the cross-check request from the request vehicle, to calculate an existence possibility expectation area of the request vehicle or the detection vehicle, to determine whether the request vehicle or the detection vehicle is present in the existence possibility expectation area, and to transmit the determination result to a surrounding vehicle including the request vehicle, wherein the request vehicle is configured to:

determine that the operating state of the sensor device is normal based on a number of the request vehicle existence responses being equal to or greater than a number of the request vehicle absence responses;

determine that the operating state of the sensor device is normal based on a number of the detection vehicle existence responses being equal to or greater than a number of a detection vehicle absence responses; and control autonomous driving of the request vehicle based on the operation state of the sensor device and the detection vehicle being present.

11. The system of claim 10, wherein:

the request vehicle is configured to transmit, to the response vehicle, the cross-check request including location information of the request vehicle, location information of the detection vehicle, speed information of the request vehicle, or speed information of the detection vehicle; and the response vehicle is configured to calculate the existence possibility expectation area based on the location information of the request vehicle, the location information of the detection vehicle, the speed information of the request vehicle, the speed information of the detection vehicle, a maximum acceleration of the request vehicle, a maximum acceleration of the detection vehicle, a maximum yaw rate of the request vehicle, a maximum yaw rate of the detection vehicle, a communication delay between the request vehicle and the response vehicle, or a communication delay between the detection vehicle and the response vehicle.

12. The system of claim 10, wherein the specified condition comprises whether a vehicle is new, whether sensor fusion data reliability of the sensor device is not greater than a specified value, whether the vehicle is stopped on a highway, whether the vehicle is driving in reverse, whether the vehicle violates a traffic rule, or whether the vehicle is driving on a shoulder lane.

13. The system of claim 10, wherein the request vehicle is configured to:

identify a positioning state of the request vehicle by comparing the number of the detection vehicle existence responses and the number of the detection vehicle absence responses received from a plurality of other vehicles including the response vehicle; and determine whether the detection vehicle is present by comparing the number of the request vehicle existence responses and the number of the request vehicle absence responses received from the plurality of other vehicles including the response vehicle.

14. The system of claim 10, wherein, in response to whether the detection vehicle is present not being determined, the request vehicle is configured to:

display a user interface for requesting a determination of whether the detection vehicle is present; and determine whether the detection vehicle is present based on receiving a user input regarding whether the detection vehicle is present through the user interface.

15. The system of claim 10, wherein:

the response vehicle is configured to transmit to the surrounding vehicle including the request vehicle the determination result including a type of a sensor, the number of sensors, reliability of the sensor, or a detected area used to detect whether the request vehicle or the detection vehicle is present in the existence possibility expectation area; and the request vehicle is configured to calculate the number of the detection vehicle existence responses, the number of the detection vehicle absence responses, the number of the request vehicle existence responses, or the number of the request vehicle absence responses by using a weight determined based on the determination result.

16. An autonomous driving control method, the method comprising:

transmitting a cross-check request for a detection vehicle or a host vehicle to at least one other vehicle by using a communication device;

determining that an operating state of a sensor device is normal based on a number of host vehicle existence responses being equal to or greater than a number of host vehicle absence responses among responses received from the at least one other vehicle in response to the cross-check request;

determining that the detection vehicle is present and the operating state of the sensor device is normal based on a number of detection vehicle existence responses being equal to or greater than a number of detection vehicle absence responses among the responses received from the at least one other vehicle in response to the cross-check request; and controlling autonomous driving of the host vehicle based on the operating state of the sensor device and the detection vehicle being present.

17. The method of claim 16, wherein the cross-check request comprises location information of the host vehicle, location information of the detection vehicle, speed information of the host vehicle, or speed information of the detection vehicle.

18. The method of claim 16, wherein the responses received from the at least one other vehicle comprise information about whether the host vehicle or the detection vehicle is present in an existence possibility expectation area calculated based on location information of the host vehicle, location information of the detection vehicle, speed information of the host vehicle, speed information of the detection vehicle, a maximum acceleration of the host vehicle, a maximum acceleration of the detection vehicle, a maximum yaw rate of the host vehicle, a maximum yaw rate of the detection vehicle, a communication delay between the host vehicle and the at least one other vehicle, or a communication delay between the detection vehicle and the at least one other vehicle.

19. The method of claim 16, wherein identifying the operating state of the sensor device comprises determining that the operating state of the sensor device is abnormal in response to a determination that the number of the host vehicle existence responses is not greater than a value obtained by subtracting '1' from the number of the host vehicle absence responses.

20. The method of claim 16, wherein determining whether the detection vehicle is present comprises determining that the detection vehicle is present and determining that the operating state of the sensor device is normal in response to a determination that the number of the detection vehicle existence responses is greater than a value obtained by subtracting '1' from the number of the detection vehicle absence responses.

\* \* \* \* \*